United States Patent
Hirata et al.

(10) Patent No.: US 11,787,884 B2
(45) Date of Patent: Oct. 17, 2023

(54) PHOTOPOLYMERIZATION INITIATOR

(71) Applicant: KJ CHEMICALS CORPORATION, Tokyo (JP)

(72) Inventors: Meiri Hirata, Tokyo (JP); Daisuke Kobayashi, Kumamoto (JP); Yoshimi Takeda, Kumamoto (JP)

(73) Assignee: KJ CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 17/783,060

(22) PCT Filed: Dec. 11, 2020

(86) PCT No.: PCT/JP2020/046328
§ 371 (c)(1),
(2) Date: Jun. 7, 2022

(87) PCT Pub. No.: WO2021/117880
PCT Pub. Date: Jun. 17, 2021

(65) Prior Publication Data
US 2023/0037488 A1 Feb. 9, 2023

(30) Foreign Application Priority Data

Dec. 13, 2019 (JP) .................................. 2019-225693

(51) Int. Cl.
| C08F 2/46 | (2006.01) |
| C08F 2/50 | (2006.01) |
| C08G 61/04 | (2006.01) |
| C08F 120/36 | (2006.01) |
| C09D 133/14 | (2006.01) |
| C09J 133/14 | (2006.01) |

(52) U.S. Cl.
CPC .......... *C08F 120/36* (2013.01); *C09D 133/14* (2013.01); *C09J 133/14* (2013.01)

(58) Field of Classification Search
CPC ............ C08F 220/302; C08F 220/1808; C08F 220/303; C08F 220/305; C08F 220/54; C08F 220/58; C08F 220/1811; C08F 120/36; C08F 2/48; C08F 2/50; C08F 290/067; C09J 133/14; Y02A 30/00

USPC .......... 522/42, 33, 6, 189, 184, 71, 1; 520/1
See application file for complete search history.

(56) References Cited

U.S. PATENT DOCUMENTS 5,248,805 A * 9/1993 Boettcher ............ C08G 65/331
522/42
2006/0142408 A1 * 6/2006 Liu ........................ C07C 271/12
522/6

FOREIGN PATENT DOCUMENTS

| JP | 2-235908 | | 9/1990 |
| JP | 2-270844 | A | 11/1990 |
| JP | 19900270844 | * | 11/1990 |
| JP | 9-504023 | | 4/1997 |
| JP | 11-80285 | A | 3/1999 |
| JP | 2000-159827 | A | 6/2000 |
| JP | 2006188687 | * | 6/2006 |
| JP | 2006-188687 | A | 7/2006 |
| JP | 2013-500303 | A | 1/2013 |
| JP | 2020-138990 | A | 9/2020 |

OTHER PUBLICATIONS

Boettcher et al, JP 19900270844 Machine Translation, Nov. 5, 1990 (Year: 1990).*
Bull et al, JP 2006188687 Machine Translation, Jun. 29, 2006 (Year: 2006).*
International Search Report and Written Opinion of the International Searching Authority issued in International Patent Application No. PCT/JP2020/046328, dated Feb. 22, 2021, along with an English translation thereof.

* cited by examiner

*Primary Examiner* — Jessica Whiteley
(74) *Attorney, Agent, or Firm* — GREENBLUM & BERNSTEIN, P.L.C.

(57) ABSTRACT

The present application provides a photopolymerization initiator having one or more ethylenic unsaturated bonds and one or more photopolymerization initiating functional groups in the molecule has been found. One or more kinds selected from an acrylamide group, an acrylate group, a vinyl group, an allyl group, a maleimide group, and the like can be suitably used as the ethylenic unsaturated bond, and a benzophenone compound having a specific structure can be suitably used as the photopolymerization initiating functional group.

18 Claims, No Drawings

PHOTOPOLYMERIZATION INITIATOR

TECHNICAL FIELD

The present invention relates to a photopolymerization initiator having an unsaturated bond and a photocurable resin composition containing the photopolymerization initiator.

BACKGROUND ART

A photo-curing reaction using active energy rays such as ultraviolet rays (UV) is generally a reaction in which: a composition, in which a photopolymerization initiator is added, is irradiated with light to generate radicals (a radical polymerization system) or ions (a cationic polymerization system or an anionic polymerization system); a source material having unsaturated groups, epoxy groups, or the like is polymerized; and the liquid composition is solidified (cured) in a short time; and is used in a wide range of fields such as in paints and coating materials, pressure-sensitive adhesive materials and adhesives, elastomer-based materials, inkjet inks, materials for sealing and caulking materials, dental hygiene materials, and optical materials. In particular, since the photocurable resin can be cured in any place and in any shape, the photocuring reaction is widely used in the field of nail cosmetics such as gel nails and the field of 3D printers using 3D stereolithography material.

Among such compositions, a photocurable resin composition using a radical photopolymerization initiator is widely used because curability is high and a wide range of physical properties can be achieved by combination with general-purpose monofunctional or polyfunctional (meth)acrylic monomers, oligomers or polymers in which (meth)acrylic groups are introduced, or the like. These days, with the spread of UV curable inks and paints, etc., requirements have risen for strengthening of safety for light sources such as absolutely no emission of light of 300 nm or less, along with size increases of UV curing apparatuses; thus, light sources such as mercury-free lamps, LED lamps, and black lights have been proposed. However, the major output light of these light sources are 365 nm (black light), 375 nm (UV-LED), and 405 nm (LED lamp); even though the safety of the light is ensured successfully, the absorption wavelengths of general-purpose photopolymerization initiators are no longer than about 350 nm and absorption of 375 nm or more is rarely seen, and problems of imperfect curing, long curing time required, and unsatisfactory physical properties of the cured product due to non-uniform curing have newly arisen.

The radical photopolymerization initiator includes an intramolecular cleavage type and a hydrogen extraction type, both of which generate a radical active species by light irradiation. A photopolymerization initiator of the intramolecular cleavage type has high efficiency of photopolymerization initiation, but it has low stability to heat and hence there has been a problem with preservation stability of the initiator and a resin composition in which it is blended. Further, unreacted initiator and residues after reaction (intramolecular cleavage) remain as low molecular compounds in the cured product, and they bleed out from the cured product over time; therefore, these residual low molecular compounds cause reduction in physical properties of the cured product, reduction in durability, generation of offensive odors, etc., and have been seen as a problem particularly with safety.

A photopolymerization initiator of the latter, i.e., the hydrogen extraction type has a diaryl ketone structure like benzophenone, which extracts hydrogen from a hydrogen donor and generates a radical active species; therefore, the problem of residues after reaction can be improved, and these days has been increasingly receiving attention. However, the initiator of this type, while having high stability to heat, has low efficiency of photopolymerization initiation, and needs to be used in combination with a hydrogen donor such as an amine, a photosensitizer, or a curing accelerator, as an additive; also unreacted additive, residues after reaction, decomposed substances, etc. are low molecular compounds, and these remain in the cured product; hence, problems can similarly arise such as reduction in physical properties of the cured product, reduction in durability, generation of offensive odors, and coloration over time.

In order to improve the efficiency of generation of a radical active species, which is an issue of the benzophenones-based photopolymerization initiator of the hydrogen extraction type, Patent Literature 1 discloses the synthesis of a benzophenone derivative having a large number of peracid ester structures in the molecule, as a high-sensitivity photopolymerization initiator. However, although sensitivity has been enhanced successfully by the introduction of peracid ester structures, the peracid ester structure itself is known to be likely to decompose because of light or heat, and there has been a problem that low molecular compounds are generated as residual substances after polymerization reaction by light irradiation.

Further, Patent Literature 2 discloses a high molecular photopolymerization initiator having a benzophenone group as a photoactive portion and an amine functional group or a tertiary amino group, which acts as a co-initiator. According to Patent Literature 2, since the high molecular photopolymerization initiator contains the amino group, inhibition by oxygen is reduced, and the speed of curing can be improved. However, both the amine and the amino group are generally recognized as functional groups having amine odors, and further it is known that these functional groups are very likely to color because of light irradiation. Furthermore, the photopolymerization initiator of Patent Literature 2 has a high molecular weight, and therefore exhibits low mobility; hence, generally has a problem that both the efficiency of production of radicals and the reactivity of photopolymerization (the speed of curing) are reduced.

CITATION LIST

Patent Literature

Patent Literature 1: JP 2000-159827 A
Patent Literature 2: JP 2013-500303 A

SUMMARY OF INVENTION

Technical Problem

An object of the present invention is to provide a photopolymerization initiator having photo curability that generates a growth active species such as a radical, a cation, or an anion by light irradiation and cures a photocurable composition and that can, by using an unsaturated bond in the molecule, be incorporated into the cured products by photocuring reaction, as a constituent component of the photocurable composition.

Solution to Problem

The present inventors conducted extensive studies and have found that a photopolymerization initiator having one or more ethylenic unsaturated bonds and one or more photopolymerization initiating functional groups in a molecule can solve the problem mentioned above; thus, have arrived at the present invention. The photopolymerization initiator has both a photopolymerization initiating functional group and a photopolymerizable functional group and has high sensitivity to long-wavelength light with wavelengths of 300 nm or more and good solubility in general-purpose monomers and oligomers. The photopolymerization initiator becomes part of the cured product after curing, as a constituent component of the photocurable resin, and low molecular decomposed substances are not produced as by-products at the time of generation of a growth active species; thus, a cured product with low offensive odors and high safety can be acquired. Furthermore, in the case where the photopolymerization initiator has one or more (meth)acrylamide groups as the ethylenic unsaturated bond in the molecule, sensitivity to highly safe light with wavelengths of 360 nm or more is high and photo curability is good, and a cured product having good strength, elongation, durability, and hydrolysis resistance can be acquired.

That is, the present invention provides the following:
(1) a photopolymerization initiator comprising one or more ethylenic unsaturated bonds and one or more photopolymerization initiating functional groups in the molecule,
(2) the photopolymerization initiator according to the aforementioned (1), in which the ethylenic unsaturated bond is one or more bonds selected from the group consisting of a (meth)acrylamide group, a (meth)acrylate group, a vinyl group, a vinyl ether group, an alkyl vinyl ether group, an allyl group, a (meth)allyl ether group, and a maleimide group,
(3) the photopolymerization initiator according to the aforementioned (1) or (2), having one or more (meth)acrylamide groups as the ethylenic unsaturated bond,
(4) the photopolymerization initiator according to any one of the aforementioned (1) to (3), in which the photopolymerization initiator generates any one or more growth active species of a radical, a cation, and an anion by light irradiation,
(5) the photopolymerization initiator according to any one of the aforementioned (1) to (4), in which the photopolymerization initiator generates a growth active species of a radical, and a cation or an anion by light irradiation,
(6) the photopolymerization initiator according to any one of the aforementioned (1) to (5), having a photopolymerization initiating functional group that generates a radical by a hydrogen extraction reaction occurring in the molecule and/or between molecules,
(7) the photopolymerization initiator according to any one of the aforementioned (1) to (6), in which the ratio between the number of photopolymerization initiating functional groups and the number of ethylenic unsaturated bonds is 1/10 to 10/1 in the molecule,
(8) the photopolymerization initiator according to any one of the aforementioned (1) to (7), having one or more benzophenone structures as the photopolymerization initiating functional group in the molecule,
(9) the photopolymerization initiator according to the aforementioned (8), having one or more urethane bonds in the molecule,
(10) the photopolymerization initiator according to any one of the aforementioned (1) to (9), represented by general formula (1):

[Chem.1]

general formula (1)

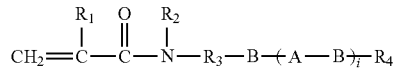

(in which $R_1$ represents a hydrogen atom or a methyl group; $R_2$ represents a hydrogen atom or a straight-chain alkyl group or a hydroxyalkylene group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms; $R_3$ represents a straight-chain alkylene group having 1 to 24 carbon atoms, an alkenyl group or an alkyleneoxyalkylene group having 2 to 24 carbon atoms, a branched alkylene group having 3 to 36 carbon atoms, or an aromatic hydrocarbon having 6 to 24 carbon atoms; $R_4$ represents a straight-chain alkyl group or a hydroxyalkylene group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with an ethylenic unsaturated bond, where the ethylenic unsaturated bond in $R_4$ is one or more bonds selected from the group consisting of a (meth)acrylamide group, a (meth)acrylate group, a vinyl group, a vinyl ether group, an alkyl vinyl ether group, an allyl group, a (meth)allyl ether group, and a maleimide group; A represents a benzophenone derivative represented by general formula (2); B represents a divalent or higher organic group having a urethane group, a urea group, an ester group, an amide group, or an imide group; and i represents an integer of 1 to 25),

[Chem. 2]

general formula (2)

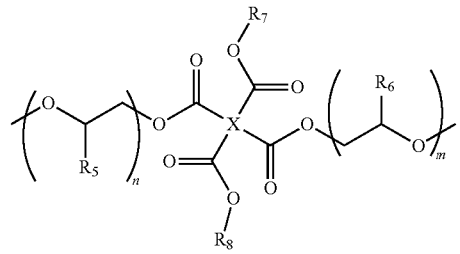

(in which $R_5$ and $R_6$ each independently represent a straight-chain alkyl group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with an ether group, a cyclic ether group, an ester group, or a halogen group; $R_7$ and $R_8$ each independently represent a straight-chain alkyl group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with a halogen group; X represents a tetravalent organic group represented by general formula (3); and n and m each independently represent an integer of 1 to 10),

[Chem. 3]

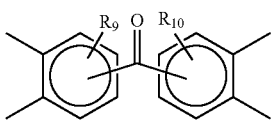

general formula (3)

(in which $R_9$ and $R_{10}$ each independently represent a hydrogen atom, a straight-chain alkyl group having 1 to 8 carbon atoms, or a branched alkyl group having 3 to 8 carbon atoms),

(11) the photopolymerization initiator according to the aforementioned (10), in which, in the photopolymerization initiator according to the general formula (1), B is a divalent or higher organic group having one or more urethane groups, and the number-average molecular weight is 1000 to 100000,

(12) the photopolymerization initiator according to any one of the aforementioned (1) to (11), having polymerization initiation ability for light of a wavelength of 300 to 450 nm, and

(13) a photopolymerizable resin composition comprising the photopolymerization initiator according to any one of the aforementioned (1) to (12).

Advantageous Effects of Invention

According to the present invention, a photopolymerization initiator having an unsaturated bond generates a growth active species by light irradiation and cures the photocurable resin composition, and also the photopolymerization initiator itself is incorporated into the cured product by photocuring reaction, as a constituent component; thus, a cured product with low offensive odors and high safety can be acquired. Further, in the case where the photopolymerization initiator of the present invention used (meth)acrylamide as the unsaturated bond, sensitivity to long-wavelength light with wavelengths of 300 nm or more was improved, solubility in general-purpose monomers and oligomers was improved, and the strength, elongation, durability, hydrolysis resistance, etc. of the obtained cured products were good. The inventors surmise that these unique effects are due to collaboration of a low-polarity functional group having a planar structural unit and having a photopolymerization initiating function and a high-polarity (meth)acrylamide group having an unsaturated bond. Many functional groups having photopolymerization initiating functions have aromatic planar structural units, and exhibit electron withdrawing properties. The inventors think that the electron conjugation region expands by introducing an amide group having strong electron donating properties to the electron withdrawing site and that thus absorption sensitivity to long-wavelength light increases, which also improved curability.

A benzophenone derivative-containing photopolymerization initiator having one or more (meth)acrylamide groups and one or more urethane bonds in the molecule, which is an embodiment of the present invention, has an excellent photopolymerization initiating function and excellent photo curability, and therefore there is no need to additionally use an amine-based hydrogen donor, a thioxanthone-based sensitizer, or the like, which improve curability. The inventors surmise that this is because efficient hydrogen extraction in the molecule and/or between molecules of the photopolymerization initiator has become feasible since a urethane group exists in the vicinity of a benzophenone tetra ester structure and/or the fact that a (meth)acrylamide group is contained in the molecule. Furthermore, in the case where a urethane bond is placed in the vicinity of a benzophenone tetra ester structure, sensitivity to light, from long-wavelength light with wavelengths of 360 nm or more to visible light with wavelengths of approximately 450 nm, is improved, and suitable use as a photopolymerization initiator is enabled even without using a special light irradiation apparatus.

DESCRIPTION OF EMBODIMENTS

Hereinbelow, embodiments of the present invention are described in detail.

A photopolymerization initiator of the present disclosure has one or more ethylenic unsaturated bonds and one or more photopolymerization initiating functional groups in the molecule. From the viewpoint of improvement in photopolymerization initiating ability and photo curability for long-wavelength light and the viewpoint of ensuring that, after photopolymerization initiation, the photopolymerization initiator can get into the cured product via a covalent bond, the photopolymerization initiator preferably has two or more ethylenic unsaturated bonds in the molecule. The ratio between the number of ethylenic unsaturated bonds and the number of photopolymerization initiating functional groups in the molecule is preferably 1/10 to 10/1, more preferably 1/8 to 8/1, and particularly preferably 1/5 to 5/1. If this ratio of numbers is less than 0.1 (1/10), even when photopolymerization reaction (curing) is ended, the photopolymerization initiator is not fixed as a structural unit in the cured product via a covalent bond; as a result, depending on the molecular weight of the photopolymerization initiator, there is a concern that a photopolymerization initiator with a low molecular weight will exist as a free low molecule in the cured product and that the problem of offensive odors of the cured product and the problem of likelihood of coloration over time cannot be solved sufficiently. On the other hand, if this ratio of numbers is more than 10.0 (10/1), depending on the amount of the photopolymerization initiator contained in the photocurable resin composition, there is a disadvantage that the speed of photopolymerization of the photocurable resin composition is considerably increased and the temperature is rapidly increased by polymerization heat and that the product is difficult to use as pressure-sensitive adhesives or adhesives for plastic base materials, or caulking materials for optical members, or as cosmetics for nails such as gel nail materials.

The ethylenic unsaturated bond contained in the photopolymerization initiator of the present disclosure is one or more bonds selected from the group consisting of a (meth)acrylamide group, a (meth)acrylate group, a vinyl group, a vinyl ether group, a methyl vinyl ether group, an allyl group, a (meth)allyl ether group, and a maleimide group. Furthermore, in the case where the photopolymerization initiator has two or more ethylenic unsaturated bonds, they may be the same or different. Moreover, the photopolymerization initiator preferably has at least one (meth)acrylamide group as the ethylenic unsaturated bond. In a radical photopolymerization initiator, the light absorption wavelength is shifted to the long wavelength side by virtue of the containing of a (meth)acrylamide group, and there is no need to use a high-energy short-wavelength light having a high risk and therefore the safety of photocuring reaction is high; further, the polymerizability of the (meth)acrylamide group is high and therefore the photo curability of the resin composition containing the radical photopolymerization initiator is high. In a photo cationic polymerization initiator and a photo anionic polymerization initiator, the (meth)acrylamide group has excellent hydrolysis resistance both under acidic conditions and under basic conditions, and therefore both the stability of the composition containing the photocationic or photoanionic polymerization initiator before curing and the durability of the cured product of the composition after curing are good.

Among photopolymerization initiators, those that generate a radical as a growth active species by light irradiation is a radical photopolymerization initiator, those that generate an acid (a cation) as a growth active species by light irradiation is a photo cationic polymerization initiator, and those that generate a base (an anion) as a growth active species by light irradiation is a photo anionic polymerization initiator. The photopolymerization initiating functional group used for the photopolymerization initiator of the present disclosure generates any one or more kinds of growth active species of a radical, a cation, and an anion by light irradiation. There are types that generate different kinds of growth active species for light of the same wavelength and types that generate the same kind or different kinds of growth active species for light rays of different wavelengths. Among them, the radical polymerization has been used for various purposes from old times; thus, it is preferable that a radical be generated as a growth active species. From the viewpoint of capability of improving polymerization inhibition due to oxygen, which is specific to the radical polymerization, a hybrid type that generates a radical and a cation simultaneously or generates a radical and an anion simultaneously is preferable. The photopolymerization initiator of the present disclosure can also be used for a dual type that uses a thermopolymerization initiator in combination. Photopolymerization and thermopolymerization may be performed simultaneously or in an arbitrary temporal order; however, in view of the fact that photopolymerization, while having high speed, produces large amounts of residual monomers, it is preferable that photopolymerization be performed first and then thermopolymerization be performed to complete polymerization reaction or crosslinking reaction.

The radical photopolymerization initiating functional group used for the photopolymerization initiator of the present disclosure is not particularly limited as long as it generates an active radical by light irradiation. For example, after light absorption, radical photopolymerization initiating functional groups include an intramolecular cleavage type that generates a radical by intramolecular cleavage, and a hydrogen extraction type and an electron donation type that generate radicals by give-and-take of hydrogen and an electron, respectively. From the viewpoint that it can exist as a structural unit in the cured product via a covalent bond after photopolymerization reaction, and from the viewpoint of ease of industrial obtainment and manufacturing, the photopolymerization initiator preferably has a hydrogen extraction type radical photopolymerization initiating functional group. For these photopolymerization initiating functional groups, one kind may be used, or two or more kinds may be used in combination.

For the radical photopolymerization initiating functional group used for the photopolymerization initiator of the present disclosure, as the photopolymerization initiating functional group of the intramolecular cleavage type, benzoin derivatives, benzyl ketals, α-hydroxyacetophenone, α-aminoacetophenone, acylphosphine oxides, titanocenes, and an o-acyloxime type are given. For these photopolymerization initiating functional groups, one kind may be used, or two or more kinds may be used in combination.

For the radical photopolymerization initiating functional group used for the photopolymerization initiator of the present disclosure, as the photopolymerization initiating functional group of the hydrogen extraction type, a benzophenone derivative having a diaryl ketone skeleton, such as benzophenone, alkyldiaminobenzophenones, 4,4'-bis(dimethylamino)benzophenone, and 4-benzoyl-4'-methyldiphenyl sulfide, and a thioxanthone derivative having a thioxanthone skeleton, such as 2-hydroxythioxanthone, are given. Benzophenone derivatives are preferable from the viewpoint of capability of achieving both high photopolymerization initiating ability and good coloration resistance. For these photopolymerization initiating functional groups, one kind may be used, or two or more kinds may be used in combination.

The photo cationic polymerization initiating functional group used for the photopolymerization initiator of the present disclosure produces an acid (cations) by irradiation with light; by these acidic ions, ethylenic unsaturated bonds contained in the photopolymerization initiator of the present disclosure, for example double bonds of vinyl ether groups, etc., are cleaved, and are polymerized. Further, epoxy groups and oxetane groups can also be cleaved by these acidic ions; in the case where compounds containing these functional groups are used in combination as constituent components of the photocurable resin composition, the initiation of photo cationic polymerization by the photopolymerization initiator and simultaneous progress of radical photopolymerization and photo cationic polymerization can be performed. As the photo cationic polymerization initiating functional group, compounds based on onium salts such as diazonium salts, iodonium salts, sulfonium salts such as triaryl sulfonium salts, and phosphonium salts are given. For these compounds, one kind may be used, or two or more kinds may be used in combination.

The photo anionic polymerization initiating functional group used for the photopolymerization initiator of the present disclosure produces a base (anions) by irradiation with light; by these basic ions, polymerization of ethylenic unsaturated bonds contained in the photopolymerization initiator of the present disclosure, for example vinyl groups, etc., is promoted. Further, photopolymerization reaction of epoxy groups or thiol groups and condensation reaction of silanols can be initiated and promoted by these basic ions; in the case where compounds containing these functional groups are used in combination as constituent components of the photocurable resin composition, the initiation of photo anionic polymerization by the photopolymerization initiator and simultaneous progress of radical photopolymerization and photo anionic polymerization can be performed. As the photo anionic polymerization initiating functional group, o-nitrobenzyl carbamate derivatives, o-acyloxyl derivatives, o-carbamoyloxime amidine derivatives, carbamates, alkylguanidinium salts, guanidine salts, and the like are given. For these compounds, one kind may be used, or two or more kinds may be used in combination.

The method for introducing various photopolymerizing functional groups to the photopolymerization initiator of the present disclosure is not particularly limited; examples include a reaction between a general-purpose photopolymerization initiator having a hydroxy group and a carboxylic acid, an epoxy, an isocyanate, an alcohol, or the like having an unsaturated bond, a neutralization reaction based on a general-purpose photopolymerization initiator having an amino group and a carboxylic acid having an unsaturated bond, a quaternarization reaction by a quaternarizing agent having an unsaturated bond, and the like. Furthermore, the polarity, solubility, molecular weight, etc. of the photopolymerization initiator can be arbitrarily adjusted by appropriately selecting and combining the structures and molecular weights of various reactive compounds having various photopolymerizing functional groups and various unsaturated bonds, which are source materials.

The photopolymerization initiator of the present disclosure can be manufactured by a known method by using the various source materials mentioned above (the photopolymerization initiator, the compound having a photopolymerization initiating functional group, the various reactive compounds having unsaturated bonds, etc.). The manufacturing method is not limited; examples include the following: (1) a method in which a photopolymerization initiator having a hydroxy group, and a carboxylic acid, an acid anhydride, a carboxylic acid halide, or an epoxy compound having an ethylenic unsaturated bond are reacted together to obtain a photopolymerization initiator having an ester structure; (2) a method in which a photopolymerization initiator having a hydroxy group and an alcohol having an ethylenic unsaturated bond are reacted together to obtain a photopolymerization initiator having an ether structure; (3) a method in which a photopolymerization initiator having a hydroxy group and an isocyanate having an ethylenic unsaturated bond are reacted together to obtain a photopolymerization initiator having a urethane structure; (4) a method in which a photopolymerization initiator having a hydroxy group and a compound having a plurality of ethylenic unsaturated bonds are reacted together to obtain a photopolymerization initiator having a Michael adduct structure; (5) a method in which a photopolymerization initiator having an amino group, and a carboxylic acid, an acid anhydride, or a carboxylic acid halide having an ethylenic unsaturated bond are reacted together to obtain a photopolymerization initiator having an amide structure; (6) a method in which a photopolymerization initiator having an amino group and an epoxy compound having an ethylenic unsaturated bond are reacted together to obtain a photopolymerization initiator having an amino group and a hydroxy group; (7) a method in which a photopolymerization initiator having an amino group and an isocyanate having an ethylenic unsaturated bond are reacted together to obtain a photopolymerization initiator having a urea structure; (8) a method in which a photopolymerization initiator having an amino group and a compound having a plurality of ethylenic unsaturated bonds are reacted together to obtain a photopolymerization initiator having a Michael adduct structure; (9) a method in which a photopolymerization initiator having an amino group and an ester compound having an ethylenic unsaturated bond are reacted together to obtain a photopolymerization initiator having an amide structure; (10) a method in which a photopolymerization initiator having an amino group and an organic acid such as a carboxylic acid or a sulfonic acid having an ethylenic unsaturated bond are caused to produce a neutralization reaction to obtain a photopolymerization initiator having a neutralized salt structure; (11) a method in which a photopolymerization initiator having an amino group of a tertiary amine and a quaternarizing agent having an ethylenic unsaturated bond are reacted together to obtain a photopolymerization initiator having a quaternary salt structure; and (12) a method in which a photopolymerization initiator having a reactive group such as an organic acid functional group such as a carboxyl group or a sulfo group, a thiol group, a phenol group, or an oxazoline group, and a compound that has an ethylenic unsaturated bond and that can react with these reactive groups are reacted together to obtain a photopolymerization initiator having any of various structures.

The molecular weight of the photopolymerization initiator of the present disclosure can be arbitrarily adjusted by combining the molecular weights of the source materials mentioned above and is preferably 200 to 100000 in terms of number-average molecular weight. When the number-average molecular weight is not less than 200, one molecule of the photopolymerization initiator can have one or more ethylenic unsaturated bonds; when the number-average molecular weight is not more than 100000, the polarity (the balance between hydrophilicity and hydrophobicity) of the obtained photopolymerization initiator is easy to adjust, solubility in each component used for the photocurable resin composition is high, the viscosity of the composition in which the photopolymerization initiator is dissolved can be controlled to within ranges suitable for various kinds of working such as coating, jetting, and extrusion, and also the transparency of the photocurable resin composition can be ensured. The photopolymerization initiator of the present invention can be categorized by molecular weight into a monomer type of a low molecular weight (the number-average molecular weight being not less than 200 and less than 1000), an oligomer-type photopolymerization initiator of a middle molecular weight (the number-average molecular weight being not less than 1000 and less than 10000), and a polymer type of a high molecular weight (the number-average molecular weight being not less than 10000 and not more than 100000). The photopolymerization initiator of the monomer type has mainly a photopolymerization initiating functional group and an ethylenic unsaturated bond; the photopolymerization initiator of the oligomer type has mainly one or more kinds of skeletons selected from a polyester skeleton, a polyether skeleton, a polycarbonate skeleton, a polyolefin skeleton, and a polyacrylic skeleton, and a photopolymerization initiating functional group and an ethylenic unsaturated bond; and the photopolymerization initiator of the polymer type has mainly one or more kinds of skeletons selected from a polycarbonate skeleton, a polyolefin skeleton, and a polyacrylic skeleton, and a photopolymerization initiating functional group and an ethylenic unsaturated bond, and contains these components repeatedly. Among them, the photopolymerization initiator of the oligomer type has excellent workability from the viewpoint of having good solubility in various general-purpose organic solvents and radical-based, cation-based, and anion-based polymerizable monomers and polymerizable oligomers used for the photocurable resin composition and the viewpoint of allowing the viscosity of the photocurable resin composition to be adjusted appropriately, and yet has high polymerization initiating ability for light, particularly has high sensitivity to long-wavelength light of 300 to 450 nm; thus, the photopolymerization initiator of the oligomer type is particularly preferable.

In the case where the photopolymerization initiator of the present disclosure is a radical photopolymerization initiating functional group of the hydrogen extraction type, the photopolymerization initiator preferably has, in the molecule, a functional group that can serve as a hydrogen-donating group. The functional group that can serve as a hydrogen-donating group is not particularly limited; examples include an amide group, a urethane group, a urea group, a hydroxy group, a thiol group, a carboxylic acid, and the like. The photopolymerization initiator more preferably has, among them, a urethane group, which is excellent in coloration resistance. The functional group that can serve as a hydrogen-donating group may be directly bonded to the photopolymerization initiating functional group; it is particularly preferable that the functional group that can serve as a hydrogen-donating group be bonded via another functional group, because hydrogen extraction can be made both between molecules and in the molecule, and sufficient polymerization initiating ability is exhibited even for highly safe long-wavelength light of wavelengths from 360 nm.

The structure of the photopolymerization initiator of the present disclosure is not particularly limited as long as the photopolymerization initiator has one or more ethylenic unsaturated bonds and one or more photopolymerization initiating functional groups in the molecule; however, a benzophenone derivative having a (meth)acrylamide group represented by general formula (1) is particularly preferable because photopolymerization initiating ability, photo curability, solubility in other components contained in the photocurable resin composition, and properties of the obtained photocured product can be adjusted easily.

[Chem.4]

general formula (1)

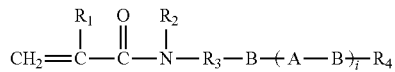

(in which $R_1$ represents a hydrogen atom or a methyl group; $R_2$ represents a hydrogen atom or a straight-chain alkyl group or a hydroxyalkylene group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms; $R_3$ represents a straight-chain alkyl group having 1 to 24 carbon atoms, an alkenyl group or an alkyleneoxyalkyl group having 2 to 24 carbon atoms, a branched alkylene group having 3 to 36 carbon atoms, or an aromatic hydrocarbon having 6 to 24 carbon atoms; $R_4$ represents a straight-chain alkyl group or a hydroxyalkylene group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with an ethylenic unsaturated bond, where the ethylenic unsaturated bond in $R_4$ is one or more bonds selected from the group consisting of a (meth)acrylamide group, a (meth) acrylate group, a vinyl group, a vinyl ether group, an alkyl vinyl ether group, an allyl group, a (meth)allyl ether group, and a maleimide group; A represents a benzophenone derivative represented by general formula (2); B represents a divalent or higher organic group having a urethane group, a urea group, an ester group, an amide group, or an imide group; and i represents an integer of 1 to 25),

[Chem. 5]

general formula (2)

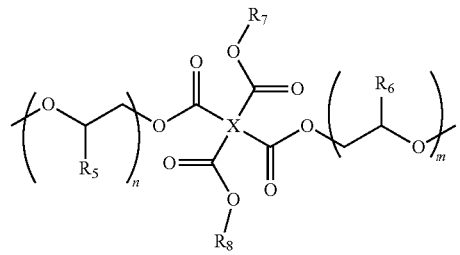

(in which $R_5$ and $R_6$ each independently represent a straight-chain alkyl group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with an ether group, a cyclic ether group, an ester group, or a halogen group; $R_7$ and $R_8$ each independently represent a straight-chain alkyl group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with a halogen group; X represents a tetravalent organic group represented by general formula (3); and n and m each independently represent an integer of 1 to 10),

[Chem. 6]

general formula (3)

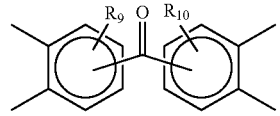

(in which $R_9$ and $R_{10}$ each independently represent a hydrogen atom, a straight-chain alkyl group having 1 to 8 carbon atoms, or a branched alkyl group having 3 to 8 carbon atoms).

The method for manufacturing a benzophenone derivative having a (meth)acrylamide group represented by general formula (1) above is not particularly limited as long as an objective compound prescribed in the present disclosure can be acquired; for example, a benzophenone derivative having a (meth)acrylamide group represented by general formula (1) above can be obtained by reacting together (1) a compound having one or more (meth)acrylamide groups and one or more reactive groups in the molecule, (2) a compound having one or more benzophenone derivatives and one or more reactive groups in the molecule, and (3) a compound having two or more reactive groups in the molecule. The reactive group in the present disclosure is one or more kinds selected from the group consisting of a hydroxy group, a thiol group, an amine group, an amino group, a carboxylic acid, an acid anhydride, a sulfonic acid, an isocyanate, an oxazoline group, a carbodiimide group, a glycidyl group, a halogen group, an ethylenic unsaturated group, a quaternarizing agent, and organic and inorganic acids and bases. The reactive group of (3) can make an organic reaction or an inorganic reaction (neutralization or the like) with the reactive groups of (1) and (2). As a result, (3) forms a linking portion between (1) and (2), and a benzophenone derivative having a (meth)acrylamide group is acquired.

For the above (2), i.e., a compound having one or more benzophenone derivatives and one or more reactive groups in the molecule, in the case where, for example, it is a compound having two or more hydroxy groups as the reactive group (a polyol having a benzophenone derivative), examples of the manufacturing method include the following methods. Note that the method for manufacturing a polyol having a benzophenone derivative is not limited to the following methods. For example, a polyol having a benzophenone derivative can be obtained by batch or successive reaction of a carboxylic acid having a benzophenone group, an epoxy group-containing compound, and a hydroxy group-containing compound, or batch or successive reaction of a carboxylic anhydride having a benzophenone group, an epoxy group-containing compound, and a hydroxy group-containing compound. The manufacturing may be performed in conformity with known conditions. The source materials may be introduced batchwise, or may be introduced dropwise of one or more source materials; the reaction temperature is preferably room temperature to 90° C. As necessary, a resolvent, a catalyst, and other additives may be used. In order to suppress the generation of growth active species due to light irradiation of benzophenone groups and benzophenone group derivatives contained in raw materials and products, it is preferable to react in an environment where light having a wavelength that absorbs them is blocked. Specifically, the reaction is preferably performed under light-shielded conditions or, in the case where mainly ultraviolet rays are absorbed, under a fluorescent lamp, a red safelight for darkrooms, or the like where ultraviolet rays are not irradiated.

Examples of the carboxylic acid or carboxylic anhydride having a benzophenone group include 3,3',4,4'-benzophenonetetracarboxylic acid, 3-(3,4-carboxybenzoyl)-1,2-benzenedicarboxylic acid, 3,3'-carbonylbis(1,2-benzenedicarboxylic acid), 3,3',4,4'-benzophenonetetracarboxylic dianhydride, 4,4'-carbonylbis(1,3-isobenzofurandione), and the like. Among them, 3,3',4,4'-benzophenonetetracarboxylic acid and 3,3',4,4'-benzophenonetetracarboxylic dianhydride are preferable because these are easily available industrially. For the carboxylic acid or carboxylic anhydride having a benzophenone group, one kind may be used singly, or two or more kinds may be used in combination.

As the epoxy group-containing compound, an epoxy having a straight-chain alkyl group having 1 to 24 carbon atoms, an alkenyl group or an alkyleneoxyalkyl group having 2 to 24 carbon atoms, a branched alkyl group or an alicyclic hydrocarbon group having 3 to 24 carbon atoms, or an aromatic hydrocarbon group having 6 to 24 carbon atoms that is optionally substituted with an ether group, a cyclic ether group, an ester group, or a halogen group is given; examples include 1,2-butylene oxide, 1,2-epoxyhexane, 1,2-epoxydodecane, 1,2-epoxytetradecane, 1,2-epoxyhexadecane, 2-(2-methylpropyl)oxirane, 2-(2,5-dimethylhexyl)oxirane, 2-(5,7-diethyloctyl)oxirane, 2-ethoxyoxirane, 2-[2-(2-methoxyethoxy)ethoxy]oxirane, butyl glycidyl ether, glycidyl phenyl ether, 2-ethylhexyl glycidyl ether, dodecyl glycidyl ether, tridecyl glycidyl ether, tetradecyl glycidyl ether, 2-[(butoxymethoxy)methyl]oxirane, 1,2-epoxycyclohexane, 2-(2-phenylbutyl)oxirane, 2-(2-cyclopropylpropyl)oxirane, oxirane-2-ethanol, 1,2-epoxy-4-butyl-4-octanol, oxirane-2-pentanol, 1-(2-oxiranyl)-2-propanone, 5-hydroxy-1-(2-oxiranyl)-2-pentanone, 3-methyl-4-(2-oxiranyl)-2-butanone, methyl oxirane-2-carboxylate, methyl 4-(oxiran-2-yl)butanoate, 1-(oxiran-2-yl)propan-2-one, methyl 3-(oxiran-2-yl)-2-oxopropanoate, oxiranylmethyl neodecanoate, and the like. Among them, 1,2-butylene oxide, butyl glycidyl ether, glycidyl phenyl ether, 2-ethylhexyl glycidyl ether, dodecyl glycidyl ether, tridecyl glycidyl ether, tetradecyl glycidyl ether, 2-[(butoxymethoxy)methyl]oxirane, 1,2-epoxydodecane, 1,2-epoxytetradecane, and 1,2-epoxyhexadecane, which provide good solubility of the obtained polyol having a benzophenone derivative, are preferable. For the epoxy group-containing compound, one kind may be used singly, or two or more kinds may be used in combination.

As the hydroxy group-containing compound, both a monool having one hydroxy group in the molecule and a polyol having two or more hydroxy groups in the molecule may be used. The monool is not particularly limited as long as it is a compound having one hydroxy group in the molecule. Examples include a monool having a straight-chain alkyl group having 1 to 24 carbon atoms, an alkenyl group or an alkyleneoxyalkyl group having 2 to 24 carbon atoms, a branched alkyl group or an alicyclic hydrocarbon group having 3 to 24 carbon atoms, or an aromatic hydrocarbon group having 6 to 24 carbon atoms that is optionally substituted with a halogen group. Specifically, methanol, ethanol, normal propanol, isopropanol, normal butanol, sec-butanol, ter-butanol, pentanol, hexanol, heptanol, octanol, decanol, lauryl alcohol, stearyl alcohol, cyclohexanol, cyclohexanemethanol, benzyl alcohol, ethylene glycol monomethylether, ethylene glycol monoethylether, ethylene glycol monobutylether, diethylene glycol monomethylether, diethylene glycol monoethylether, diethylene glycol monobutylether, propylene glycol monomethylether, trifluoroethanol, tetrafluoropropanol, and the like are given. Among them, methanol, ethanol, normal propanol, isopropanol, normal butanol, sec-butanol, and ter-butanol are preferable because these are easily available industrially. For the hydroxy group-containing compound, one kind may be used singly, or two or more kinds may be used in combination.

The polyol is not particularly limited as long as it is a compound having two or more hydroxy groups in the molecule, and a diol having a straight-chain alkyl group or a hydroxyalkylene group having 1 to 24 carbon atoms, an alkenyl group or an alkyleneoxyalkyl group having 2 to 24 carbon atoms, a branched alkyl group or an alicyclic hydrocarbon group having 3 to 24 carbon atoms, or an aromatic hydrocarbon group having 6 to 24 carbon atoms that is optionally substituted with a halogen group is given. Specifically, ethylene glycol, 1,2-propanediol, 1,3-propanediol, 1,2-butanediol, 1,3-butanediol, 1,4-butanediol, 1,5-pentanediol, 1,6-hexanediol, 1,8-octanediol, 1,9-nonanediol, 1,24-tetracosanediol, 3-methyl-1,5-pentanediol, 3,3-dimethylolheptane, diethylene glycol, dipropylene glycol, neopentyl glycol, 1,4-cycloheptanediol, 2,7-norbornanediol, and the like are given.

A solvent may be used when manufacturing the above (2), i.e., a compound having one or more benzophenone derivatives and one or more reactive groups in the molecule. In the case where an organic resolvent is used as the solvent, examples include toluene, xylene, acetone, methyl ethyl ketone, methyl isobutyl ketone, cyclohexanone, ethyl acetate, butyl acetate, methylene chloride, N,N-dimethylformamide, 3-methoxy-N,N-dimethylpropionamide, 3-butoxy-N,N-dimethylpropionamide, dimethylacetamide, dimethyl sulfoxide, 2-pyrrolidone, N-methyl-2-pyrrolidone, 1,3-dimethyl-2-imidazolidinone, and the like. As the solvent, a polymerizable (radical-based, cation-based, or anion-based polymerization by light or heat) compound that does not react with the source material, or the product may also be used. Examples include various (meth)acrylic acid esters, various N-substituted (meth)acrylamides and N,N-disubstituted (meth)acrylamides, and (meth)acryloylmorpholine in which a chain and/or cyclic hydrocarbon group (having 1 to 22 carbon atoms) or an alkoxy group (having 1 to 22 carbon atoms) is introduced as a substituent, and the like.

Examples of the reaction catalyst used when manufacturing the above (2), i.e., a compound having one or more benzophenone derivatives and one or more reactive groups in the molecule include quaternary ammonium salts, quaternary phosphonium salts, tertiary phosphine derivatives, tertiary amine derivatives, organic metal compounds, etc. Examples of the quaternary ammonium salt include tetrabutylammonium bromide, triethylbenzylammonium chloride, and the like. Examples of the quaternary phosphonium salts include tetrabutylphosphonium bromide, tetraphenylphosphonium bromide, and the like. Examples of the tertiary phosphine include triarylphosphines such as triphenylphosphine, tribenzylphosphine, and tritolylphosphine, tricycloalkylphosphines such as tricyclohexylphosphine, trialkylphosphines such as triethylphosphine, tripropylphosphine, tributylphosphine, and trioctylphosphine, and the like. Examples of the tertiary amine include trialkylamines such as triethylamine and tributylamine, dialkylarylamines such as dimethylbenzylamine and diethylbenzylamine, triethanolamine, and the like. As the organic metal compound, any catalyst used for ring-opening reaction of an epoxy group may be used; examples include a metal salt or the like of a metal such as zinc, tin, lead, zirconium, bismuth, cobalt, manganese, or iron and an organic acid such as octenoic acid or naphthenic acid, metal chelate compounds and the like such as dibutyltin dilaurate, dioctyltin dilaurate, tin 2-ethylhexanoate, dibutyltin diacetylacetonate, zirconium tetraacetylacetonate, titanium acetylacetonate, acetylacetone aluminum, acetylacetone cobalt, acetylacetone iron, acetylacetone copper, and acetylacetone zinc, a potassium or sodium salt or the like of an alkylphosphonic acid, and a sodium or potassium salt or the like of a fatty acid having 8 to 20 carbon atoms. Furthermore, these may be used singly or in combination of two or more kinds. Among them, quaternary ammonium salts, quaternary phosphonium salts, tertiary phosphine derivatives, and tin-based, zirconium-based, or iron-based organic metal compounds, which have high catalytic effects, are more preferable.

The amount of the above reaction catalyst used is not particularly limited but is preferably 0.001 to 5.0% in terms of mass ratio relative to the total mass of the source materials. When the amount of the reaction catalyst is not less than 0.001%, reaction can progress rapidly; when the amount of the reaction catalyst is not more than 5.0%, coloration due to the catalyst can be suppressed; thus, this is preferable. The amount of the reaction catalyst is still more preferably 0.01 to 1.0%.

The above (1), i.e., a compound having one or more (meth)acrylamide groups and one or more reactive groups in the molecule is not particularly limited. A compound having one or more (meth)acrylamide groups in the molecule and having any one or more kinds of structure selected from a hydroxy group, an amino group, and a carboxyl group is preferable.

The (meth)acrylamide group-containing compound having a hydroxy group may be used as a monool or a polyol as long as it is a compound having one or more (meth)acrylamide groups and one or more hydroxy groups. Examples include N-hydroxyalkyl (having 1 to 22 carbon atoms) (meth)acrylamides such as N-hydroxymethyl(meth)acrylamide, N-hydroxyethyl(meth)acrylamide, and N-hydroxypropyl(meth)acrylamide, N-alkyl (having 1 to 22 carbon atoms) hydroxyalkyl (having 1 to 22 carbon atoms) (meth)acrylamides such as N-methylhydroxyethyl(meth)acrylamide and N-ethylhydroxypropyl(meth)acrylamide, N,N-dihydroxyalkyl (having 1 to 22 carbon atoms) (meth)acrylamides such as N,N-dihydroxymethyl(meth)acrylamide and N,N-dihydroxyethyl(meth)acrylamide, and the like. In particular, N-hydroxyethyl(meth)acrylamide has a high refractive index (1.502) and therefore can provide excellent transparency, has a low skin irritation (PII=0) and is therefore highly safe and easy to handle, and can be easily obtained as high-purity industrial products; thus, this is preferable. For these (meth)acrylamide group-containing compounds having hydroxy groups, one kind may be used singly, or two or more kinds may be used in combination.

The (meth)acrylamide group-containing compound having an amino group is not particularly limited as long as it is a compound having one or more (meth)acrylamide groups and one or more amino groups; examples include N-aminoalkyl (having 1 to 22 carbon atoms) (meth)acrylamides, N-aminoalkyl (having 1 to carbon atoms)-N-alkyl (having 1 to 22 carbon atoms) (meth)acrylamides, N,N-diaminoalkyl (having 1 to 22 carbon atoms) (meth)acrylamides, and the like. For these (meth)acrylamides having amino groups, one kind may be used singly, or two or more kinds may be used in combination.

The (meth)acrylamide group-containing compound having a carboxyl group is not particularly limited as long as it is a compound having one or more (meth)acrylamide groups and one or more carboxyl groups; examples include N-carboxyalkyl (having 1 to 22 carbon atoms) (meth)acrylamides, N-carboxyalkyl (having 1 to 22 carbon atoms)-N-alkyl (having 1 to 22 carbon atoms) (meth)acrylamides, N,N-dicarboxyalkyl (having 1 to 22 carbon atoms) (meth)acrylamides, and the like. For these (meth)acrylamides having carboxyl groups, one kind may be used singly, or two or more kinds may be used in combination.

The above (3), i.e., a compound having two or more reactive groups in the molecule has only to be a compound that can react with the above (1) and (2), and it is not particularly limited. The reactive group to be contained in the compound can be appropriately selected in accordance with the reactive groups of the above (1) and (2). From the viewpoint that B according to general formula (1) above is preferably a divalent or higher organic group having a urethane group, a urea group, an ester group, an amide group, or an imide group, the reactive group contained in the compound is preferably an isocyanate group, an amine group, an amino group, or a carboxylic acid group. By a process in which these reactive groups and a hydroxy group, an amine group, a carboxylic anhydride, etc. that are the reactive groups of the above (1) and (2) react together, a urethane group, a urea group, an ester group, an amide group, or an imide group can be introduced as a hydrogen-donating functional group into the molecule of the photopolymerization initiator of the present disclosure, and photopolymerization initiating ability is improved.

In the case where the photopolymerization initiator obtained by reacting together the above (1), (2), and (3) has a structure in which an ester group is directly bonded to a benzophenone group, the photopolymerization initiating ability of the benzophenone group is improved; thus, this is preferable. From a similar point of view, the photopolymerization initiator more preferably has a benzophenone tetra-ester structure shown in general formula (2). Furthermore, although a precise mechanism is not clear, in the case where a benzophenone group, four ester groups directly bonded to the benzophenone group, and a urethane bond are contained collectively in the same molecule, photopolymerization initiating ability is increased and at the same time also sensitivity to long-wavelength light having wavelengths of 360 nm or more is improved, by interaction between these functional groups between molecules and/or in the molecule; thus, this is particularly preferable. Furthermore, a photopolymerization initiator having such a structure has high solubility in monomers and oligomers, organic resolvents, etc. used in combination in the photocurable resin composition, and allows the viscosity of the photocurable resin composition to be appropriately adjusted in accordance with the purpose and use; thus, makes it possible to acquire a cured product having good coloration resistance after photocuring.

In the case where the above (3), i.e., a compound having two or more reactive groups in the molecule has two or more isocyanate groups as the reactive group, the isocyanate group may be a general-purpose polyisocyanate, or may be a polyisocyanate having a polyol skeleton obtained by reacting a general-purpose polyisocyanate and a polyol together.

The general-purpose polyisocyanate is a compound having two or more isocyanate groups in the molecule; specifically, aliphatic polyisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,4,4-trimethylhexamethylene diisocyanate, and 2,2,4-trimethylhexamethylene diisocyanate, aromatic polyisocyanates such as 1,3-phenylene diisocyanate, 1,4-phenylene diisocyanate, 2,4-tolylene diisocyanate, 2,6-tolylene diisocyanate, 4,4'-diphenylmethane diisocyanate, 2,4-diphenylmethane diisocyanate, 1,3-xylylene diisocyanate, and 1,4-xylylene diisocyanate, and alicyclic polyisocyanates such as cyclopentylene diisocyanate, cyclohexylene diisocyanate, isophorone diisocyanate, 4,4'-dicyclohexylmethane diisocyanate, 1,3-hydrogenated-xylylene diisocyanate, 1,4-hydrogenated-xylylene diisocyanate, 2,5-norbornane diisocyanate, and 2,6-norbornane diisocyanate, or multimers of an adduct type, an isocyanurate type, a biuret type, and the like of these polyisocyanates are given. For these polyisocyanates, one kind may be used singly, or two or more kinds may be used in combination.

The polyol used for synthesis of the polyisocyanate having a polyol skeleton has only to be a compound having two or more hydroxy groups in the molecule. Examples include polyether polyols, polyester polyols, polycarbonate polyols, polyolefin polyols, and silicone polyols having two or more hydroxy groups in the molecule. For these polyols, one kind may be used singly, or two or more kinds may be used in combination.

As the polyether polyol, a straight-chain, branched, or cyclic polyalkylene glycol having 2 to 18 carbon atoms is given; specifically, alkylene glycols such as polyethylene glycol, glycerin tri(polyoxymethylene) ether, trimethylolpropane tri(polyoxyethylene) ether, pentaerythritol tetra(polyoxyethylene) ether, poly(oxy-1,3-propylene) glycol, glycerin tri(polyoxy-1,3-propylene) ether, trimethylolpropane tri(polyoxy-1,3-propylene) ether, pentaerythritol tetra(polyoxy-1,3-propylene) ether, poly(oxy-1,2-propylene) glycol, glycerin tri(polyoxy-1,2-propylene) ether, trimethylolpropane tri(polyoxy-1,2-propylene) ether, pentaerythritol tetra(polyoxy-1,2-propylene) ether, poly(oxy-1,4-butylene) glycol, poly(oxy-1,5-pentylene) glycol, poly(oxy-3-methyl-1,5-pentylene) glycol, and poly(oxy-1,6-hexylene) glycol are given. Among them, polyethylene glycol, poly(oxy-1,2-propylene) glycol, and poly(oxy-1,4-butylene) glycol are preferable because these are easily available industrially.

The polyester polyol is a compound that is composed of a polycarboxylic acid and a polyol, that includes a polyester skeleton in the molecule, and that has a hydroxy group at a terminal. As the polycarboxylic acid component, phthalic acid, tetrahydrophthalic acid, terephthalic acid, isophthalic acid, 1,2-cyclohexanedicarboxylic acid, 1,2-cyclohexanedicarboxylic acid, 1,3-cyclohexanedicarboxylic acid, 1,4-cyclohexanedicarboxylic acid, succinic acid, maleic acid, fumaric acid, adipic acid, azelaic acid, sebacic acid, dodecanedioic acid, 1,2,4-butanetricarboxylic acid, hemimellitic acid, trimellitic acid, trimesic acid, cyclohexanetricarboxylic acid, pyromellitic acid, cyclohexanetetracarboxylic acid, and the like are given; as the polyol component, ethylene glycol, 1,2-propylene glycol, 1,3-propylene glycol, 1,2-butanediol, 1,4-butanediol, 1,2-pentanediol, 1,5-pentanediol, 1,2-hexanediol, 1,6-hexanediol, 1,4-cyclohexanedimethanol, 3-methyl-1,5-pentanediol, 1,2-octanediol, 1,8-octanediol, 1,2-nonanediol, 1,9-nonanediol, isosorbide, neopentyl glycol, glycerin, trimethylolpropane, pentaerythritol, and the like are given. Among them, a polyester polyol composed of one or more polycarboxylic acids among adipic acid, terephthalic acid, isophthalic acid, and sebacic acid as the polycarboxylic acid is preferable because this is easily available industrially.

The polycarbonate polyol is a compound that is composed of a carbonyl component and a polyol, that includes a carbonate skeleton in the molecule, and that has a hydroxy group at a terminal. As the carbonyl component, phosgene, chloroformic acid esters, dialkyl carbonates, diaryl carbonates, alkylene carbonates, and the like are given; as the polyol component, ethylene glycol, 1,2-propylene glycol, 1,3-propylene glycol, 1,2-butanediol, 1,4-butanediol, 1,2-pentanediol, 1,5-pentanediol, 1,2-hexanediol, 1,6-hexanediol, 1,4-cyclohexanedimethanol, 3-methyl-1,5-pentanediol, 1,2-octanediol, 1,8-octanediol, 1,2-nonanediol, 1,9-nonanediol, 1,10-decanediol, isosorbide, neopentyl glycol, glycerin, trimethylolpropane, pentaerythritol, dipentaerythritol, and the like are given. Among them, a polycarbonate polyol composed of one or more carbonyl components among phosgene, dimethyl carbonate, and diphenyl carbonate as the carbonyl component is preferable because this is easily available industrially.

As the polyolefin polyol, hydrogenated polyalkadienepolyols and polyalkadienepolyols are given; as the hydrogenated polyalkadienepolyol, hydrogenated 1,2-polybutadienediol, hydrogenated 1,4-polybutadienediol, hydrogenated polyisoprene polyols, and the like are given; as the polyalkadienepolyol, 1,2-polybutadienediol, 1,4-polybutadienediol, polyisoprene polyols, and the like are given. Among them, hydrogenated 1,2-polybutadienediol, hydrogenated 1,4-polybutadienediol, and hydrogenated polyisoprene polyols are preferable because these are excellent in weather resistance.

The silicone polyol is a compound that has a silicone main chain skeleton in the molecule and that has one or more hydroxy groups at a terminal of the main chain skeleton or on a side chain. Specifically, both-terminal-carbinol-modified polydimethylsiloxane, side-chain-carbinol-modified polydimethylsiloxane, both-terminal-hydroxyethoxyethyl-modified polydimethylsiloxane, side-chain-hydroxyethoxyethyl-modified polydimethylsiloxane, both-terminal-polyether-modified polydimethylsiloxanes, side-chain-polyether-modified polydimethylsiloxanes, and the like are given. Among them, both-terminal-carbinol-modified polydimethylsiloxane is preferable because gelation is less likely to occur during urethane synthesis.

For the photopolymerization initiator of the present disclosure, it is preferable that the average number of benzophenone derivatives per molecule be 1 to 20. When the average number is not less than 1, sufficient photopolymerization initiating ability as a photopolymerization initiator is exhibited; if the average number is more than 20, photopolymerization initiating ability is considerably high, and there is a concern that the speed of photopolymerization reaction will be difficult to control, depending on the mass contained in the photocurable resin composition. From a similar point of view, the average number is more preferably 1 to 10.

For the photopolymerization initiator of the present disclosure, it is preferable that the average number of urethane bonds per molecule be 1 to 40. When the average number is not less than 1, the effects derived from various urethane bonds described above can be provided; if the average number is more than 40, the polarity of the photopolymerization initiator is high, and solubility in components used in combination in the photocurable resin composition tends to be reduced. From a similar point of view, the average number is more preferably 2 to 30.

The photopolymerization initiator of the present disclosure can generate a growth active species such as a radical, a cation, or an anion by light irradiation. As the light source used for light irradiation, light energy rays such as visible light, electron rays, ultraviolet rays, infrared rays, X-rays, α-rays, β-rays, and γ-rays are given. Among them, ultraviolet rays are preferably used in terms of balance between the apparatus for generating active energy rays, the speed of photopolymerization initiation, and safety. As the ultraviolet ray source, a xenon lamp, a low-pressure mercury lamp, a high-pressure mercury lamp, a metal halide lamp, a UV-LED lamp, a microwave-type excimer lamp, and the like are given, and a UV-LED lamp, which has high efficiency of conversion of energy to light, achieves high output easily, and does not use harmful mercury, is more preferably used.

The irradiation energy required to generate a growth active species such as a radical, a cation, or an anion by light irradiation of the photopolymerization initiator of the present disclosure slightly varies with the use or the light source; the irradiation energy (the integrated amount of light) is preferably in the range of 5 to 50000 mJ/cm$^2$, and it is more preferably 10 to 20000 mJ/cm$^2$. When the irradiation energy is within this range, a growth active species having sufficient activity is generated from the photopolymerization initiator; thus, this is preferable.

The photopolymerization initiator of the present disclosure can be used as substitutes for conventional photopolymerization initiators by being contained in various photocurable resin compositions. The amount contained varies with the structure of the photopolymerization initiator or the make-up of the photocurable resin composition; when 0.1 mass % or more is added, photopolymerization can be initiated immediately, and the photocurable resin composition is cured sufficiently by light irradiation; thus, this is preferable. Further, the photopolymerization initiator has an ethylenic unsaturated bond; therefore, even in the case where the amount contained is 100 mass %, the photopolymerization initiator can be sufficiently cured similarly to the photocurable resin composition. The photopolymerization initiator may be used in combination with other unsaturated group-containing compounds in order to adjust physical properties of the cured product suitably; in this case, the amount of the photopolymerization initiator contained is more preferably 0.5 to 70 mass % and most preferably 1 to 50 mass % relative to the entire photocurable resin composition.

As the unsaturated group-containing compound, monofunctional unsaturated compounds and polyfunctional unsaturated compounds are given. The amount of the unsaturated group-containing compound contained is preferably 0 to 99 mass % relative to the entire photocurable resin composition. The amount of the unsaturated group-containing compound contained is more preferably 50 to 99 mass % in order to adjust physical properties of the cured product suitably.

As the monofunctional unsaturated compound, a compound containing a (meth)acrylate group, a (meth)acrylamide group, a vinyl group, an allyl group, a styryl group, an acetylene group, or the like is given; for these, one kind may be used singly, or two or more kinds may be used in combination. The amount of the monofunctional unsaturated compound contained is, relative to the entire photocurable resin composition, preferably 0 to 90 mass %, more preferably 5 to 70 mass %, and most preferably 10 to 50 mass %. The monofunctional unsaturated compound usually has low viscosity, and effects such as a reduction in viscosity of the photocurable resin composition and an improvement in workability can be expected by appropriately containing the monofunctional unsaturated compound.

As the monofunctional unsaturated compound containing a (meth)acrylate group (excluding the photopolymerization initiator), specifically, alkyl (meth)acrylates in which a straight-chain, branched, or cyclic alkyl group having 1 to 22 carbon atoms is introduced, hydroxyalkyl (meth)acrylates in which a straight-chain, branched, or cyclic hydroxyalkyl group having 1 to 22 carbon atoms is introduced, an alkyl (meth)acrylate carboxylic acid composed of (meth) acrylic acid and a hydroxyalkylcarboxylic acid, such as ethyl (meth)acrylate carboxylic acid, ethyl (meth)acrylate succinic acid, ethyl (meth)acrylate phthalic acid, and ethyl (meth)acrylate hexahydrophthalic acid, alkyl (meth)acrylate sulfonic acids in which a straight-chain, branched, or cyclic alkylsulfonic acid group having 1 to 22 carbon atoms is introduced, alkyl (meth)acrylate phosphoric acids in which a straight-chain, branched, or cyclic alkylphosphoric acid group having 1 to 22 carbon atoms is introduced, alkoxyalkylene glycol (meth)acrylates, alkoxydialkylene glycol (meth)acrylates, alkoxytrialkylene glycol (meth)acrylates, and alkoxypolyalkylene glycol (meth)acrylates in which a functional group composed of an alkoxy group having 1 to 22 carbon atoms and an alkylene glycol group having 1 to 4 carbon atoms is introduced, phenoxyalkylene glycol (meth)acrylates, phenoxydialkylene glycol (meth)acrylates, phenoxytrialkylene glycol (meth)acrylates, and phenoxypolyalkylene glycol (meth)acrylates in which a functional group composed of a phenoxy group and an alkylene glycol group having 1 to 4 carbon atoms is introduced, N-alkylamino (meth)acrylates in which an aminoalkyl group having 1 to 6 carbon atoms is introduced, N-alkylaminoalkyl (meth)acrylates in which a N-alkylaminoalkyl group composed of an aminoalkyl group having 1 to 6 carbon atoms and an alkyl group having 1 to 6 carbon atoms is introduced, N,N-dialkylaminoalkyl (meth)acrylates in which a N,N-dialkylaminoalkyl group composed of an aminoalkyl group having 1 to 6 carbon atoms and alkyl groups each having 1 to 6 carbon atoms is introduced, (meth)acrylates in which a cyclic structure is introduced, such as benzyl (meth)acrylate, phenoxyethyl (meth)acrylate, dicyclopentanyl (meth)acrylate, dicyclopentanyloxyethyl (meth)acrylate, dicyclopentenyl (meth)acrylate, dicyclopentenyloxyethyl (meth)acrylate, bornyl (meth)acrylate, isobornyl (meth)acrylate, tetrahydrofurfuryl (meth)acrylate, and 2-methyl-2-adamantyl (meth)acrylate, and (meth)acrylates in which an epoxy group is introduced, such as glycidyl (meth)acrylate and 4-hydroxybutyl (meth)acrylate glycidyl ether, are given. Among them, benzyl (meth)acrylate, phenoxyethyl (meth)acrylate, dicyclopentanyl (meth)acrylate, dicyclopentanyloxyethyl (meth)acrylate, dicyclopentenyl (meth)acrylate, dicyclopentenyloxyethyl (meth)acrylate, isobornyl (meth)acrylate, cyclohexyl (meth)acrylate, and 4-t-butylcyclohexyl (meth)acrylate are preferable because various physical properties of the cured product can be balanced easily.

As the monofunctional unsaturated compound containing a (meth)acrylamide group (excluding the photopolymerization initiator), specifically, (meth)acrylamide, mono- or di-substituted (meth)acrylamides, (meth)acryloylmorpholine, diacetone (meth)acrylamide, and the like are given; examples of the mono- or di-substituted (meth)acrylamide include N-alkyl(meth)acrylamides and N,N-dialkyl(meth)acrylamides in which a straight-chain, branched, or cyclic alkyl group having to 22 carbon atoms is introduced, N-hydroxyalkyl(meth)acrylamides, N,N-di(hydroxyalkyl) (meth)acrylamides, and N-hydroxyalkyl-N-(4-hydroxyphenyl) (meth)acrylamides in which a hydroxyalkyl group having 1 to 6 carbon atoms is introduced, N-alkyl-N-hydroxyalkyl (meth)acrylamides in which a hydroxyalkyl group having 1 to 6 carbon atoms and an alkyl group having 1 to 6 carbon atoms are introduced, N-alkyl-N-(4-hydroxyphenyl) (meth)acrylamides, 4-hydroxyphenyl(meth)acrylamide, N,N-di(4-hydroxyphenyl) (meth)acrylamide, N-alkoxyalkyl(meth)acrylamides and N,N-di(alkoxyalkyl)(meth)acrylamides in which an alkoxyalkyl group composed of an alkoxy group having 1 to 6 carbon atoms and an alkylene group having 1 to 6 carbon atoms is introduced, N-alkyl-N-alkoxyalkyl (meth)acrylamides in which an alkoxyalkyl group composed of an alkoxy group having 1 to 6 carbon atoms and an alkylene group having 1 to 6 carbon atoms, and an alkyl group having 1 to 6 carbon atoms are introduced, N-sulfoalkylacrylamides in which an alkylsulfonic acid group having 1 to 6 carbon atoms is introduced, N-alkylamino(meth)acrylamides in which an aminoalkyl group having 1 to 6 carbon atoms is introduced, N-alkylaminoalkyl(meth)acrylamides in which a N-alkylaminoalkyl group composed of an aminoalkyl group having 1 to 6 carbon atoms and an alkyl group having 1 to 6 carbon atoms is introduced, N,N-dialkylaminoalkyl(meth)acrylamides in which a N,N-dialkylaminoalkyl group composed of an aminoalkyl group having 1 to 6 carbon atoms and alkyl groups each having 1 to 6 carbon atoms is introduced, and the like. Among them, N,N-dimethylacrylamide, N,N-diethylacrylamide, N-isopropylacrylamide, N-dimethylaminopropylacrylamide, N-hydroxyethylacrylamide, N-acryloylmorpholine, diacetone acrylamide, and N-(1,1-dimethyl-3-oxobutyl)acrylamide are preferable because these are easily available industrially; among them, N,N-dimethylacrylamide, N,N-diethylacrylamide, N-dimethylaminopropylacrylamide, N-hydroxyethylacrylamide, and N-acryloylmorpholine are more preferable because these are liquids and provide high workability.

As the monofunctional unsaturated compound containing a vinyl group (excluding the photopolymerization initiator), specifically, vinyl carboxylate esters in which a carboxylic acid having 1 to 22 carbon atoms is introduced, alkyl vinyl ethers in which a straight-chain, branched, or cyclic alkyl group having 1 to 22 carbon atoms is introduced, vinyl chloride, N-vinylpyrrolidone, N-vinyl caprolactam, N-vinyloxazoline, maleic acid, maleic anhydride, fumaric acid, itaconic acid, itaconic anhydride, monoalkyl maleate esters, dialkyl maleate esters, monoalkylmaleamides, dialkylmaleamides, alkylmaleimides, monoalkyl fumarate esters, dialkyl fumarate esters, monoalkylfumaramides, dialkylfumaramides, monoalkyl itaconate esters, dialkyl itaconate esters, monoalkylitaconamides, dialkylitaconamides, and alkylitaconimides in which a straight-chain, branched, or cyclic alkyl group having 1 to 22 carbon atoms is introduced, vinylcarboxylic acids, vinylsulfonic acids, vinylphosphoric acids, and the like are given. Among them, N-vinylpyrrolidone, N-vinylcaprolactam, maleic anhydride, and the like are preferable because these are easily available industrially.

As the monofunctional unsaturated compound containing an allyl group (excluding the photopolymerization initiator), specifically, allyl carboxylate esters in which a carboxylic acid having 1 to 22 carbon atoms is introduced, alkyl allyl ethers in which a straight-chain, branched, or cyclic alkyl group having 1 to 22 carbon atoms is introduced, phenyl allyl ether, alkylphenyl allyl ethers, allylamine, mono- or di-alkylallylamines in which a branched or cyclic alkyl group is introduced, and the like are given.

As the monofunctional unsaturated compound containing a styryl group (excluding the photopolymerization initiator), specifically, styrene, α-alkylstyrene in which an alkyl group having 1 to 22 carbon atoms is introduced to the α-position, an α-methylstyrene dimer, o-alkylstyrene, m-alkylstyrene, and p-alkylstyrene in which an alkyl group having 1 to 22 carbon atoms is introduced to the phenyl group, p-styrenesulfonic acid in which a sulfonic acid group is introduced, and the like are given. Among them, styrene, α-methylstyrene, and an α-methylstyrene dimer are preferable because these are easily available industrially.

As the polyfunctional unsaturated compound, a compound containing two or more unsaturated groups among a (meth)acrylate group, a (meth)acrylamide group, a vinyl group, an allyl group, a styrene group, an acetylene group, and the like is given; the compound may be a compound containing one kind of these unsaturated groups singly, or may be a compound containing two or more kinds of these unsaturated groups in a composite manner. In order to obtain good curability, it is more preferable to use, as the unsaturated group, at least one or more (meth)acrylate groups or (meth)acrylamide groups. The amount of the polyfunctional unsaturated compound (excluding the photopolymerization initiator) contained is, relative to the entire photocurable resin composition, preferably 0 to 99 mass %, more preferably 1 to 70 mass %, and most preferably 5 to 50 mass %. By appropriately containing the polyfunctional unsaturated compound, the strength and hardness of the obtained cured product are increased, and excellent durability can be expected.

As the polyfunctional unsaturated compound, allyl (meth)acrylate, allyl(meth)acrylamide, diallylamine, alkyldiallylamines in which an alkyl group having 1 to 22 carbon atoms is introduced, an onium salt formed by combining at least one kind of anion selected from known inorganic acid anions or organic acid anions and a dialkyldiallylammonium cation in which an alkyl group having 1 to 22 carbon atoms is introduced, alkylene glycol di(meth)acrylates, polyalkylene glycol di(meth)acrylates, bisphenol A diglycidyl ether acrylic acid addition products, alkoxylated bisphenol A diacrylates, polyester di(meth)acrylates, polycarbonate di(meth)acrylates, polyurethane di(meth)acrylates, and polyurethane di(meth)acrylamides are given; and as trifunctional or more polyfunctional unsaturated compounds, pentaerythritol tri(meth)acrylate, pentaerythritol tetra(meth)acrylate, trimethylolpropane tri(meth)acrylate, dipentaerythritol tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, isocyanuric acid ethylene-oxide-modified tri(meth)acrylate, ethylene-oxide-modified dipentaerythritol penta(meth)acrylate, ethylene-oxide-modified dipentaerythritol hexa(meth)acrylate, ethylene-oxide-modified pentaerythritol tri(meth)acrylate, ethylene-oxide-modified pentaerythritol tetra(meth)acrylate, succinic-acid-modified pentaerythritol tri(meth)acrylate, and the like are given. For these polyfunctional unsaturated compounds, one kind may be used singly, or two or more kinds may be used in combination.

The number-average molecular weight of the polyfunctional unsaturated compound is preferably 100 to 20000. When the number-average molecular weight is not less than 100, the curing shrinkage of the obtained cured product can be suppressed to a low level; thus, this is preferable. When the number-average molecular weight is not more than 20000, the liquid viscosity of the photocurable resin composition can be controlled to a low level, and operability is excellent; thus, this is preferable. The number-average molecular weight is more preferably 200 to 10000.

The photopolymerization initiator of the present disclosure has sufficient sensitivity even without using other sensitizers, but it may be used in combination with a sensitizer or other photopolymerization initiators for the purposes of further improving sensitivity and improving physical properties of the cured product after curing.

The sensitizer that can be used in combination with the photopolymerization initiator of the present disclosure is not particularly limited; examples include unsaturated ketones typified by benzophenones, anthracene derivatives and the like, 1,2-diketone derivatives typified by benzyl, camphorquinone and the like, benzoin derivatives, anthraquinone derivatives, thioxanthone derivatives, coumarin derivatives, tertiary amines, thiols, disulfides, and the like. These may be used at an arbitrary ratio as necessary, and it may be used as one kind singly or may be used in combination of two or more kinds.

As other polymerization initiators that can be used in combination with the photopolymerization initiator of the present disclosure, benzoins such as benzoin and benzoin alkyl ethers, acetophenones such as acetophenone and 2-hydroxy-2-methyl-1-phenylpropan-1-one, anthraquinones, thioxanthones, ketals, benzophenones, aminoacetophenones, xanthones, and the like are given; but the other polymerization initiators are not limited to these; where these may be used at an arbitrary ratio as necessary, and may be used as one kind singly or may be used in combination of two or more kinds.

The photocurable resin composition may be used without containing an organic resolvent. In order to improve workability such as coatability, an organic resolvent may be added to adjust liquid viscosity, as necessary. When performing photocuring, the curing may be performed after the added organic resolvent is removed in advance, or the curing may be performed with the organic resolvent contained as-is. The organic resolvent may be removed after curing; the organic resolvent may be appropriately selected in accordance with the ways of use and the purposes of the photocurable resin composition and the obtained cured product. The amount of organic resolvent added is not particularly limited, but in terms of capability of reducing the energy and time required to remove the organic resolvent, is preferably not more than 80 mass % and more preferably not more than 50 mass % relative to the entire photocurable resin composition.

As the organic resolvent used for the photocurable resin composition, alcohols such as methanol, ethanol, and isopropanol, ketones such as acetone, methyl ethyl ketone, methyl isobutyl ketone, and cyclohexanone, esters such as ethyl acetate, propyl acetate, butyl acetate, methyl lactate, and ethyl lactate, alkylene glycols such as ethylene glycol and propylene glycol, polyalkylene glycols such as polyethylene glycol and polypropylene glycol, glycol ethers such as ethoxydiethylene glycol and methoxypropylene glycol, glycol esters such as propylene glycol acetate, ethers such as tetrahydrofuran, methyltetrahydrofuran, cyclopentyl methyl ether, methyltetrahydropyran, and methyl tert-butyl ether, aromatic hydrocarbons such as toluene and xylene, aliphatic hydrocarbons such as hexane and cyclohexane, amides such as N,N-dimethylformamide and dimethylacetamide, amide ethers such as β-methoxy-N,N-dimethylpropionamide and β-butoxy-N,N-dimethylpropionamide, pyrrolidones such as 2-pyrrolidone and N-methylpyrrolidone, piperidines such as N-methylpiperidine, halogenated hydrocarbons and the like such as methylene chloride, chloroform, and dichloroethane, sulfoxides such as dimethyl sulfoxide, imidazolidinones such as 1,3-dimethyl-2-imidazolidinone, and the like are given. For these organic resolvents, one kind may be used singly, or two or more kinds may be used in combination.

The photopolymerization initiator of the present disclosure can be suitably used for UV flexo inks, UV offset inks, UV screen inks, UV inkjet inks, photocurable nail cosmetic compositions (gel nail materials), UV curable pressure-sensitive adhesives, UV curable adhesives, photocurable caulking agents used for materials for sealing, caulking materials and the like, photocurable coating agents used for paints, coating materials, and the like of automobiles, electrical appliances, furniture and the like, photocurable resin compositions for decorative sheets used for decorative sheets used for surface coating and the like of automobiles and electrical appliances, photocurable resin compositions for self-healing materials used for functional members, devices and the like such as coating agents, stereo shaped objects, nail decorating materials, automotive exterior protections, and decorative films having self-healing properties, photocurable elastomer compositions used for materials for elastomers used for transparent pressure-sensitive adhesive sheets, shock absorbing materials, packings, vibration-proof materials, sound absorbing materials, printing plates, sealing materials, polishers and the like, photocurable resin compositions for stereo shaping such as model materials and support materials for 3D printers, photocurable vehicular coating material compositions such as automotive paints, etc.

EXAMPLES

Hereinbelow, the present invention is described still more specifically by showing Examples and Comparative Examples; however, the present invention is not limited to these Examples. In the following, all descriptions of "parts" and "%" are on a mass basis unless otherwise specified.

(1) Infrared Absorption Spectrum Analysis (IR Analysis)

IR analysis was performed with the following apparatus.
Nicolet iS50 (manufactured by Thermo Fisher Scientific K.K.)

(2) Liquid Chromatography Mass Spectroscopy (LC-MS Analysis)

LC-MS analysis was performed with the following apparatus under the following conditions.

Column: XBridge C18, 4.6 mm×150 mm, 3.5 μm (manufactured by Nihon Waters K.K.); eluent conditions: water/methanol/1%-formic acid aqueous solution=60/30/10; measuring wavelength: 258 nm; column oven: 40° C.

(3) Nuclear Magnetic Resonance Spectrum Analysis (NMR Analysis)

NMR analysis was performed with an apparatus of 400 MHz manufactured by JEOL Ltd.

(4) Gas Chromatography Analysis (GC Analysis)

GC analysis was performed with GC-2025 (manufactured by Shimadzu Corporation) and a column (DB-1, manufactured by Agilent Technologies Japan, Ltd.).

(5) Gel Permeation Chromatography Analysis (GPC Analysis)

GPC analysis was performed with the following apparatus under the following conditions.

Apparatus: Prominence-I LC-2030C (manufactured by Shimadzu Corporation); guard column: one guard column of KF-G of Shodex (manufactured by Showa Denko K.K.); column: one column of KF-806L of Shodex (manufactured by Showa Denko K.K.); column temperature: 40° C.; mobile phase: tetrahydrofuran (THF); speed of liquid feeding: 0.5 mL/min; standard sample: polystyrene Polyols (E) and isocyanate compounds (F) used for the Examples and the Comparative Examples are shown below.

(1) Polyol (E)
- E-1: KF-6000 (carbinol-modified silicone oil, a diol type, manufactured by Shin-Etsu Chemical Co., Ltd., number-average molecular weight: 1700)
- E-2: KURARAY POLYOL P-1010 (a polyester polyol, a diol type, manufactured by Kuraray Co., Ltd., number-average molecular weight: 1000)
- E-3: UH-100 (a polycarbonate diol of 1,6-HD, manufactured by Ube Industries, Ltd., number-average molecular weight: 1000)
- E-4: GI-1000 (polybutadienediol, manufactured by Nippon Soda Co., Ltd., number-average molecular weight: 1500)
- E-5: UNIOL D-1000 (polypropylene glycol, manufactured by NOF Corporation, number-average molecular weight: 1000)
- E-6: KURARAY POLYOL P-5010 (a polyester polyol, a diol type, manufactured by Kuraray Co., Ltd., number-average molecular weight: 5000)
- E-7: UNIOL D-400 (polypropylene glycol, manufactured by NOF Corporation, number-average molecular weight: 400)

(2) Isocyanate Compound (F)
- F-1: 1,5-Pentamethylene diisocyanate
- F-2: Isophorone diisocyanate (IPDI)
- F-3: Toluene diisocyanate (TDI)
- F-4: Trimer (an isocyanurate) of IPDI (VESTANAT T1890/100, manufactured by Evonik Industries AG)

Commercially available photopolymerization initiators (G), monofunctional unsaturated compounds (H), polyfunctional unsaturated compounds (I), and other components (J) used for the Examples and the Comparative Examples are shown below.

(1) Commercially Available Photopolymerization Initiator (G)
- G-1: 1-Hydroxycyclohexyl phenyl ketone (Omnirad 184, manufactured by IGM Resins B.V.)
- G-2: 1-[4-(2-Hydroxyethyl)phenyl]-2-hydroxy-methyl-propanone (Omnirad 2959, manufactured by IGM Resins B.V.)
- G-3: 2-Hydroxy-1-(4-(4-(2-hydroxy-2-methylpropionyl)phenoxy)phenyl)-2-methylpropan-1-one (ESACURE KIP 160, manufactured by IGM Resins B.V.)
- G-4: Benzophenone
- G-5: 4,4'-Bis(dimethylamino)benzophenone (2) Monofunctional Unsaturated Compound (H)
- H-1: Dimethylacrylamide (registered trademarks "Kohshylmer" and "DMAA", manufactured by KJ Chemicals Corporation)
- H-2: Isobornyl acrylate
- H-3: Acryloylmorpholine (registered trademarks "Kohshylmer" and "ACMO", manufactured by KJ Chemicals Corporation)
- H-4: 4-t-Butylcyclohexyl acrylate (registered trademark "Kohshylmer", manufactured by KJ Chemicals Corporation)

(3) Polyfunctional Unsaturated Compound (I)
- I-1: A-400 (polyethylene glycol 400 diacrylate, manufactured by Shin-Nakamura Chemical Co, Ltd.)
- I-2: EBECRYL270 (an aliphatic bifunctional urethane acrylate, manufactured by Daicel-Allnex Ltd., average molecular weight: 1500)
- I-3: Hexanediol diacrylate (LIGHT ACRYLATE 1,6HX-A, manufactured by Kyoeisha Chemical Co., Ltd.)
- I-4: Dipentaerythritol hexaacrylate (LIGHT ACRYLATE DPE-6A, manufactured by Kyoeisha Chemical Co., Ltd.)

(4) Other Components (J)
- J-1: TEGO Rad2100 (silicon acrylate, manufactured by Evonik Industries AG)
- J-2: Pentaerythritol tetrakis(3-mercaptobutyrate) (manufactured by Showa Denko K.K.)
- J-3: MEK-ST-40 (a colloidal silica dispersion, manufactured by Nissan Chemical Corporation)

Synthesis Example 1: Synthesis of a Photopolymerization Initiator Having an Unsaturated Bond (C-1)

60.0 g (0.4 mol) of trifluoromethanesulfonic acid and 7.2 g (0.4 mol) of water were slowly mixed while cooling was performed in a 300-mL-capacity flask provided with a reflux condenser tube, a stirrer, a thermometer, and a dropping funnel, and thus trifluoromethanesulfonic acid hydrate was prepared. While the temperature was kept at 40° C., a mixture of 10.6 g (0.2 mol) of acrylonitrile, 40.8 g (0.2 mol) of (G-1), and 0.1 g of phenothiazine was slowly added from a dropping funnel. After the dropping was ended, stirring was continued at 70° C. for 2 hours. After the reaction was ended, 50 g of water and g of toluene were added to the reaction liquid, and extraction was performed. The obtained organic layer was concentrated and recrystallized, and thereby 31.8 g of a white solid was obtained. IR analysis, LC-MS analysis, and NMR analysis were performed, and it was determined that the obtained solid was a photopolymerization initiator (C-1) having an acrylamide group as an unsaturated bond and having a molecular weight of 257.

Further, GC analysis was performed, and it was found that the purity of the product was 98.5% and the yield was 62%. The ratio between the number of ethylenic unsaturated bonds (acrylamide groups) and the number of photopolymerization initiating functional groups (an intramolecular cleavage type that generates radicals) was 1/1.

Synthesis Example 2: Synthesis of a Photopolymerization Initiator Having an Unsaturated Bond (C-2)

Synthesis and analysis were performed by methods similar to those of Synthesis Example 1 except that 26.8 g of methacrylonitrile was used in place of acrylonitrile and 68.5 g of (G-3) was used in place of (G-1); thus, a photopolymerization initiator (C-2) having a methacrylamide group as an unsaturated bond and having a molecular weight of 477 was obtained. The purity was 98.8%, and the yield was 67%. The ratio between the number of ethylenic unsaturated bonds (methacrylamide groups) and the number of photopolymerization initiating functional groups (an intramolecular cleavage type that generates radicals) was 1/1.

Synthesis Example 3: Synthesis of a Photopolymerization Initiator Having an Unsaturated Bond (C-3)

20.8 g (0.24 mol) of methyl acrylate, 18.9 g (0.22 mol) of (G-2), 100 g of cyclohexane, 0.1 g of phenothiazine, and 0.1 g of dioctyltin oxide were added into a flask similar to that used in Synthesis Example 1. The temperature of the reaction liquid was increased to 80° C. while stirring was performed, and reaction was further performed at 80° C. for 12 hours. After the reaction was ended, an azeotrope of methanol and cyclohexane produced was distilled out, then an azeotrope of unreacted methyl acrylate and cyclohexane was distilled out, and 4-(2-acryloyloxyethoxy)phenyl (2-hydroxy-2-propyl) ketone was obtained. Acrylonitrile was reacted with this by a method similar to that of Synthesis Example 1, and analysis was performed by a method similar to that of Synthesis Example 1; thus, a photopolymerization initiator (C-3) that was a pale yellow, transparent, viscous, thick liquid having an acrylate group and an acrylamide group as unsaturated bonds and having a molecular weight of 331 was obtained. The purity was 95.2%, and the yield was 54%. The ratio between the number of ethylenic unsaturated bonds (acrylate groups and acrylamide groups) and the number of photopolymerization initiating functional groups (an intramolecular cleavage type that generates radicals) was 2/1.

Synthesis Example 4: Synthesis of a Photopolymerization Initiator Having an Unsaturated Bond (C-4)

28.2 g (0.2 mol) of 2-isocyanatoethyl acrylate, 0.02 g of dibutyltin dilaurate (DBTDL), and 50 g of methyl ethyl ketone (MEK) were added into a flask similar to that used in Synthesis Example 1. While the temperature was kept at 40° C., a mixture of 42.4 g (0.2 mol) of benzoin and 0.1 g of phenothiazine was slowly added from a dropping funnel. After the dropping was ended, stirring was continued at 70° C. for 2 hours. After the reaction was ended, the resolvent was distilled off by a reduced pressure method, and recrystallization was performed; thus, a white solid was obtained. IR analysis, LC-MS analysis, and NMR analysis were performed, and it was determined that the white solid was a photopolymerization initiator (C-4) having an acrylate group as an unsaturated bond and having a molecular weight of 353. Further, GC analysis was performed, and it was found that the purity of the product was 97.7% and the yield was 88%. The ratio between the number of ethylenic unsaturated bonds (acrylate groups) and the number of photopolymerization initiating functional groups (an intramolecular cleavage type that generates radicals) was 1/1.

Synthesis Example 5: Synthesis of a Photopolymerization Initiator Having an Unsaturated Bond (C-5)

A urethanization reaction was performed by a method similar to that of Synthesis Example 4 except that 44.5 g of (F-2) was used in place of 2-isocyanatoethyl acrylate and 40.9 g of (G-1) was used as a photopolymerization initiator having a hydroxy group, and a compound having an isocyanate group was obtained as an intermediate. While the temperature was kept at 70° C., 28.2 g (0.2 mol) of hydroxyethylmaleimide was slowly added into a solution of the intermediate from a dropping funnel. After the dropping was ended, stirring was further continued at 70° C. for 4 hours. After the reaction was ended, the resolvent was distilled off by a reduced pressure method, and recrystallization was performed; thus, a white solid was obtained. IR analysis, LC-MS analysis, and NMR analysis were performed, and it was determined that the white solid was a photopolymerization initiator (C-5) having a maleimide group as an unsaturated bond and having a molecular weight of 528. Further, GC analysis was performed, and it was found that the purity of the product was 96.5% and the yield was 92%. The ratio between the number of ethylenic unsaturated bonds (maleimide groups) and the number of photopolymerization initiating functional groups (an intramolecular cleavage type that generates radicals) was 1/1.

Synthesis Example 6: Synthesis of a Photopolymerization Initiator Having an Unsaturated Bond (C-6)

A urethanization reaction was performed by a method similar to that of Synthesis Example 4 except that 52.5 g of dicyclohexylmethane 4,4'-diisocyanate was used in place of 2-isocyanatoethyl acrylate and 40.8 g of (G-1) was used as a photopolymerization initiator having a hydroxy group, and a compound having an isocyanate group was obtained as an intermediate. While the temperature was kept at 30° C., 11.4 g (0.2 mol) of allylamine was slowly added into a solution of the intermediate from a dropping funnel. After the dropping was ended, stirring was further continued at 40° C. for 6 hours. After the reaction was ended, the resolvent was distilled off by a reduced pressure method, and recrystallization was performed; thus, a white solid was obtained. IR analysis, LC-MS analysis, and NMR analysis were performed, and it was determined that the white solid was a photopolymerization initiator (C-6) having an allyl group as an unsaturated bond and having a molecular weight of 466. Further, GC analysis was performed, and it was found that the purity of the product was 93.8% and the yield was 94%. The ratio between the number of ethylenic unsaturated bonds (allyl groups) and the number of photopolymerization initiating functional groups (an intramolecular cleavage type that generates radicals) was 1/1.

Synthesis Example 7: Synthesis of a Benzophenone Group-Containing Compound (D-1)

60.0 g of 3,3',4,4'-benzophenonetetracarboxylic dianhydride (BTDA), 22.6 g of isopropyl alcohol, 46.6 g of 1,2-epoxyhexane, 62 g of ethyl acetate, and 17.1 g of triphenylphosphine (TPP) as a catalyst were added into a flask similar to that used in Synthesis Example 1, and reaction was performed for 24 hours while stirring was performed at 60° C. After the reaction was ended, cleaning was performed with 5% sulfuric acid and a saturated sodium hydrogen carbonate aqueous solution, and the organic layer was isolated. This was dried with anhydrous sodium sulfate, then the drying agent was filtered out, and vacuum concentration was performed; thus, 108.2 g of a pale yellow viscous liquid was obtained. By IR analysis of the obtained viscous liquid, absorption based on C=O stretching vibration of a carbonyl group derived from an ester (1725 cm$^{-1}$) was detected, and absorption based on C=O stretching vibration of a carbonyl group derived from BTDA (1770 cm$^{-1}$ and 1851 cm$^{-1}$) was not detected. Production of the objective benzophenone group-containing compound (D-1) was determined by agreement between the molecular ion peak of a mass spectrum obtained by LC-MS analysis and the molecular weight (643) obtained by calculation.

Synthesis Example 8: Synthesis of a Benzophenone Group-Containing Compound (D-2)

40.0 g of BTDA, 33.7 g of Carbitol, 44.7 g of glycidyl butyrate, and 16.1 g of ethyltriphenylphosphonium bromide (ETPPB) as a catalyst were added into a flask similar to that used in Synthesis Example 1, and reaction was performed for 12 hours while stirring was performed at 90° C. After the reaction was ended, analysis, purification, identification, etc. were performed in a similar manner to Synthesis Example 7, and it was determined that the obtained 106.7 g of a pale-yellow viscous liquid was the objective benzophenone group-containing compound (D-2) with a molecular weight of 879.

Synthesis Example 9: Synthesis of a Benzophenone Group-Containing Compound (D-3)

45.0 g of BTDA, 28.2 g of trifluoroethanol, 51 g of N,N-dimethylformamide (DMF), and 3.41 g of 4-dimethylaminopyridine as a catalyst were added into a flask similar to that used in Synthesis Example 1, and reaction was performed for 8 hours while stirring was performed at 50° C. After that, 45.5 g of tert-butyl glycidyl ether and 2.56 g of 4-dimethylaminopyridine as a catalyst were added to the solution, and reaction was performed for 16 hours while stirring was performed at 70° C. After the reaction was ended, analysis, purification, identification, etc. were performed in a similar manner to Synthesis Example 7, and it was determined that the obtained 198.5 g of a pale-yellow viscous liquid was the objective benzophenone group-containing compound (D-3) with a molecular weight of 783.

Synthesis Example 10: Synthesis of a Benzophenone Group-Containing Compound (D-4)

40.0 g of BTDA, 26.1 g of ethylene glycol monoacetate, 49 g of 3-methoxy-N,N-dimethylpropanamide (registered trademark "KJCMPA", manufactured by KJ Chemicals Corporation), and 8.00 g of tetrabutylammonium bromide as a catalyst were added into a flask similar to that used in Synthesis Example 1, and reaction was performed for 1 hour while stirring was performed at 100° C. After that, 49.7 g of 1,2-epoxyhexane and 9.60 g of tetrabutylammonium bromide as a catalyst were added to the solution, and reaction was performed for 12 hours while stirring was performed at 100° C. After the reaction was ended, analysis, purification, identification, etc. were performed in a similar manner to Synthesis Example 7, and it was determined that the obtained 92.4 g of a pale-yellow viscous liquid was the objective benzophenone group-containing compound (D-4) with a molecular weight of 831.

Synthesis Example 11: Synthesis of a Benzophenone Group-Containing Compound (D-5)

23.0 g of BTDA, 47.1 g of docosanol, 33.2 g of 2-ethylhexyl glycidyl ether, 48 g of MEK, and 3.85 g of tetramethylammonium bromide as a catalyst were added into a flask similar to that used in Synthesis Example 1, and reaction was performed for 18 hours while stirring was performed under MEK refluxing. After the reaction was ended, analysis, purification, identification, etc. were performed in a similar manner to Synthesis Example 7, and it was determined that the obtained 94.2 g of a pale-yellow viscous liquid was the objective benzophenone group-containing compound (D-5) with a molecular weight of 1348.

Synthesis Example 12: Synthesis of a Benzophenone Group-Containing Compound (D-6)

25.0 g of BTDA, 7.2 g of ethanol, 63.0 g of 1,2-epoxydocosane, 24 g of DMF, and 7.82 g of TPP as a catalyst were added into a flask similar to that used in Synthesis Example 1, and reaction was performed for 20 hours while stirring was performed at 70° C. After the reaction was ended, analysis, purification, identification, etc. were performed in a similar manner to Synthesis Example 7, and it was determined that the obtained 92.4 g of a pale-yellow viscous liquid was the objective benzophenone group-containing compound (D-6) with a molecular weight of 1064.

Synthesis Example 13: Synthesis of a Benzophenone Group-Containing Compound (D-7)

30.0 g of BTDA, 16.9 g of 1,2-butanediol, 35 g of ethyl acetate, and 6.91 g of ETPPB as a catalyst were added into a flask similar to that used in Synthesis Example 1, and reaction was performed for 4 hours while stirring was performed at 65° C. After that, 75.6 g of 3-perfluorobutyl-1,2-epoxypropane and 5.18 g of ETPPB as a catalyst were added to the solution, and reaction was performed for 16 hours while stirring was performed at 90° C. After the reaction was ended, analysis, purification, identification, etc. were performed in a similar manner to Synthesis Example 7, and it was determined that the obtained 101.7 g of a pale-yellow viscous liquid was the objective benzophenone group-containing compound (D 7) with a molecular weight of 1152.

Synthesis Example 14: Synthesis of a Benzophenone Group-Containing Compound (D-8)

Like in the apparatus used in Synthesis Example 1, 50.0 g of BTDA and 250 g of DMF were added into a 500-mL flask, and 24.5 g of propanolamine was slowly added from a dropping funnel. After the dropping was ended, stirring was continued at 30° C. for 2 hours. After that, reaction was performed for 10 hours while the solution was stirred at 145° C. After the reaction was ended, filtration was performed, and recrystallization was performed; thus, 61.5 g of a pale-yellow solid was obtained. By IR analysis of the obtained pale-yellow solid, absorption based on C=O stretching vibration (1725 cm$^{-1}$ and 1775 cm$^{-1}$) and absorption based on C—N—C stretching vibration (1375 cm$^{-1}$) of an imide group were detected, and absorption based on C=O stretching vibration of a carbonyl group derived from BTDA was not detected. Production of the objective benzophenone group-containing compound (D-8) was determined by agreement between the molecular ion peak of a mass spectrum obtained by LC-MS analysis and the molecular weight (436) obtained by calculation.

Synthesis Example 15: Synthesis of a Photopolymerization Initiator Having an Unsaturated Bond (C-7)

37.4 g of (F-1), 77.9 g of (D-1), 24.6 g of N-methylolacrylamide (NMAA), 0.06 g of tin 2-ethylhexanoate as a catalyst, 0.10 g of dibutylhydroxytoluene (BHT) as a polymerization inhibitor, and 60 g of ethyl acetate as a solvent were added into a flask similar to that used in Synthesis Example 1, and reaction was performed for 8 hours while stirring was performed at 70° C. After the reaction was ended, it was determined by IR analysis that the absorption peak of the isocyanate group disappeared. The reaction liquid was concentrated, precipitation purification was performed with methanol, and then vacuum drying was performed; thus, 128.7 g of a pale-yellow solid was obtained. By IR analysis of the obtained solid, absorption based on N—H deformation vibration of a urethane bond (1532 cm$^{-1}$) was detected, and absorption based on C=O stretching vibration of a ketone group derived from (D-1) (1650 cm$^{-1}$) was detected; thus, production of the objective photopolymerization initiator (C-7) having an acrylamide group as an unsaturated bond was determined. Further, by GPC analysis, the number-average molecular weight of (C-7) was calculated to be 1700. The ratio between the number of ethylenic unsaturated bonds (acrylamide groups) and the number of photopolymerization initiating functional groups (benzophenone groups) was 1/2.

Synthesis Example 16: Synthesis of a Photopolymerization Initiator Having an Unsaturated Bond (C-8)

68.9 g of (D-2), 78.4 g of (E-1), 43.5 g of (F-2), 9.1 g of N-hydroxyethylacrylamide (registered trademarks "Kohshylmer" and "HEAA", manufactured by KJ Chemicals Corporation), 0.06 g of acetylacetone iron as a catalyst, and 0.10 g of BHT were added into a flask similar to that used in Synthesis Example 1. The temperature was increased to 70° C. while the mixture was stirred, and then reaction was performed at 70° C. for 10 hours. Analysis, purification, identification, etc. were performed in a similar manner to Synthesis Example 15, and it was determined that the obtained 189.9 g of a pale-yellow viscous liquid was the objective photopolymerization initiator (C-8) having an acrylamide group as an unsaturated bond. Further, by GPC analysis, the number-average molecular weight of (C-8) was calculated to be 7500. The ratio between the number of ethylenic unsaturated bonds (acrylamide groups) and the number of photopolymerization initiating functional groups (benzophenone groups) was 1/1.

Synthesis Example 17: Synthesis of a Photopolymerization Initiator Having an Unsaturated Bond (C-9)

80.1 g of (D-3), 25.6 g of (E-2), 26.8 g of (F-3), 7.4 g of hydroxypropylmethacrylamide, 0.06 g of DBTDL, 0.10 g of BHT, and 60 g of "ACMO" were added into a flask similar to that used in Synthesis Example 1. The temperature was increased to 60° C. while the mixture was stirred, and then reaction was performed at 60° C. for 12 hours; thus, 127.7 g of a pale-yellow viscous liquid was obtained. Identification, etc. were performed by IR analysis in a similar manner to Synthesis Example 15, and it was determined that the obtained pale yellow viscous liquid was an "ACMO" solution of the objective photopolymerization initiator (C-9) having an acrylamide group as an unsaturated bond. Further, by GPC analysis, the number-average molecular weight of (C-9) was calculated to be 8200. In (C-9), the ratio between the number of ethylenic unsaturated bonds (methacrylamide groups) and the number of photopolymerization initiating functional groups (benzophenone groups) was 1/2.

Synthesis Example 18: Synthesis of a Photopolymerization Initiator Having an Unsaturated Bond (C-10)

12.1 g of "HEAA", 58.1 g of (F-4), 26.2 g of (E-3), 43.5 g of (D-4), 0.06 g of acetylacetone zinc as a catalyst, 0.10 g of BHT, and 60 g of "KJCMPA" as a solvent were added into a flask similar to that used in Synthesis Example 1. The temperature was increased to 80° C. while the mixed liquid was stirred, and then reaction was performed at 80° C. for 6 hours. After the reaction was ended, analysis, purification, identification, etc. were performed in a similar manner to Synthesis Example 15, and it was determined that the obtained 124.3 g of a pale-yellow viscous liquid was the objective photopolymerization initiator (C-10) having an acrylamide group as an unsaturated bond. Further, by GPC analysis, the number-average molecular weight of (C-10) was calculated to be 24100. The ratio between the number of ethylenic unsaturated bonds (acrylamide groups) and the number of photopolymerization initiating functional groups (benzophenone groups) was 2/1.

Synthesis Example 19: Synthesis of a Photopolymerization Initiator Having an Unsaturated Bond (C-11)

47.0 g of (D-7), 40.8 g of (E-4), 35.5 g of (F-3), 16.5 g of NMAA, 0.06 g of 1,4-diazabicyclo[2.2.2]octane as a catalyst, 0.10 g of BHT, and 60 g of DMF were added into a flask similar to that used in Synthesis Example 1. The temperature was increased to 70° C. while the mixture was stirred, and reaction was performed at 70° C. for 7 hours; then, analysis, purification, identification, etc. were performed in a similar manner to Synthesis Example 15, and it was determined that the obtained 126.8 g of a pale-yellow viscous liquid was the objective photopolymerization initiator (C-11) having an acrylamide group as an unsaturated bond. Further, by GPC analysis, the number-average molecular weight of (C-11) was calculated to be 5100. The ratio between the number of ethylenic unsaturated bonds (acrylamide groups) and the number of photopolymerization initiating functional groups (benzophenone groups) was 4/1.

Synthesis Example 20: Synthesis of a Photopolymerization Initiator Having an Unsaturated Bond (C-12)

75.9 g of (D-2), 33.7 g of (E-5), 28.8 g of (F-2), 1.5 g of NMAA, 0.06 g of DBTDL, 0.10 g of BHT, and 60 g of MEK were added into a flask similar to that in the apparatus used in Synthesis Example 1. The temperature was increased to 60° C. while the mixed liquid was stirred, and then reaction was performed at 60° C. for 12 hours. After the reaction was ended, analysis, purification, identification, etc. were performed in a similar manner to Synthesis Example 15, and it was determined that the obtained 129.1 g of a pale-yellow viscous liquid was the objective photopolymerization initiator (C-12) having an acrylamide group as an unsaturated bond. Further, by GPC analysis, the number-average molecular weight of (C-12) was calculated to be 29100. The ratio between the number of ethylenic unsaturated bonds (acrylamide groups) and the number of photopolymerization initiating functional groups (benzophenone groups) was 1/6.

Synthesis Example 21: Synthesis of a Photopolymerization Initiator Having an Unsaturated Bond (C-13)

Using an apparatus similar to that of Synthesis Example 1, 3.8 g of (D-5), 129.0 g of (E-6), 7.0 g of (F-2), 0.8 g of N-(2-hydroxyethyl)maleimide, 0.06 g of acetylacetone zinc as a catalyst, and 0.10 g of BHT were added into a flask. The temperature was increased to 75° C. while the mixed liquid was stirred, and the stirring was continued at 75° C. for further 8 hours. After that, analysis, purification, identification, etc. were performed in a similar manner to Synthesis Example 15, and it was determined that the obtained 128.9 g of a pale-yellow viscous liquid was the objective photopolymerization initiator (C-13) having a maleimide group as an unsaturated bond. Further, by GPC analysis, the number-average molecular weight of (C-13) was calculated to be 73600. The ratio between the number of ethylenic unsaturated bonds (maleimide groups) and the number of photopolymerization initiating functional groups (benzophenone groups) was 2/1.

Synthesis Example 22: Synthesis of a Photopolymerization Initiator Having an Unsaturated Bond (C-14)

Using an apparatus similar to that of Synthesis Example 1, 69.3 g of (D-6), 43.4 g of (E-3), 60 g of "KJCMPA", and 0.10 g of BHT were added into a flask. The temperature was increased to 70° C., and mixing was performed well. After that, 22.7 g of (F-3) and 0.04 g of tin 2-ethylhexanoate as a catalyst were added to the solution, and reaction was performed for 4 hours while stirring was performed at 70° C.; IR analysis was performed, and it was determined that the decrease of the absorption peak of the isocyanate group was suspended. After that, 4.5 g of ethylene glycol monoallyl ether and 0.02 g of tin 2-ethylhexanoate were added to the solution, and reaction was performed for 6 hours while stirring was performed at 70° C. After the reaction was ended, it was determined by IR analysis that the absorption peak of the isocyanate group disappeared. After that, analysis, purification, identification, etc. were performed in a similar manner to Synthesis Example 15, and it was determined that the obtained 123.2 g of a pale-yellow viscous liquid was the objective photopolymerization initiator (C-14) having an allyl group as an unsaturated bond. Further, by GPC analysis, the number-average molecular weight of (C-14) was calculated to be 9700. The ratio between the number of ethylenic unsaturated bonds (allyl groups) and the number of photopolymerization initiating functional groups (benzophenone groups) was 1/1.5.

Synthesis Example 23: Synthesis of a Photopolymerization Initiator Having an Unsaturated Bond (C-15)

Using an apparatus similar to that of Synthesis Example 1, 47.2 g of adipic acid, 15.3 g of 3-methyl-1,5-pentanediol, 113.4 g of (D-2), and 0.10 g of BHT were added into a flask, the temperature was increased to 190° C. under normal pressure while nitrogen was passed, 0.04 g of zinc oxide was added as a catalyst to the mixed liquid, and reaction was performed while the condensation water was distilled out at a temperature of 195° C. After the reaction was ended, it was determined that the acid value was 43 mg KOH/g (conforming to JIS K 0070-1992). After that, the reflux condenser was replaced with a Dean-Stark-type azeotropic fractionation apparatus, 24.0 g of (6-hydroxyhexyl)methacrylamide and 2 g of concentrated sulfuric acid were added to the reaction liquid, and water produced at 125° C. was azeotropically separated together with toluene to the outside of the reaction system. After that, methanol was added to the reaction liquid, precipitation purification was performed, and vacuum drying was performed; thus, 185.2 g of a pale-yellow viscous liquid was obtained. Analysis, purification, identification, etc. were performed in a similar manner to Synthesis Example 15, and it was determined that the obtained pale yellow viscous liquid was (C-15). GPC analysis was performed on the obtained photopolymerization initiator (C-15) having a methacrylamide group as an unsaturated bond, and thereby the number-average molecular weight was calculated to be 4600. The ratio between the number of ethylenic unsaturated bonds (methacrylamide groups) and the number of photopolymerization initiating functional groups (benzophenone groups) was 1/1.

Synthesis Example 24: Synthesis of a Photopolymerization Initiator Having an Unsaturated Bond (C-16)

Using an apparatus similar to that of Synthesis Example 23, 87.6 g of adipic acid dichloride, 41.7 g of hexamethylenediamine, 30 g of N-methyl-2-pyrrolidone (NMP), and 0.10 g of BHT were added to a flask, then mixing was performed well, and reaction was performed for 1 hour while the temperature was kept at 0° C. After the reaction was ended, 17.5 g of (D-2) was added, and reaction was performed for 1 hour. After that, 23.1 g of "HEAA" was added to the solution, and reaction was performed for 1 hour. After the reaction was ended, analysis, purification, identification, etc. were performed in a similar manner to Synthesis Example 15, and it was determined that the obtained 158.2 g of a pale-yellow viscous liquid was the objective photopolymerization initiator (C-16) having an acrylamide group as an unsaturated bond. Further, by GPC analysis, the number-average molecular weight of (C-16) was calculated to be 9200. The ratio between the number of ethylenic unsaturated bonds (acrylamide groups) and the number of photopolymerization initiating functional groups (benzophenone groups) was 10/1.

Synthesis Example 25: Synthesis of a Photopolymerization Initiator Having an Unsaturated Bond (C-17)

Using an apparatus similar to that of Synthesis Example 23, 78.3 g of pyromellitic anhydride, 106.4 g of (F-2), 30 g of NMP, 2.85 g of triethylenediamine, and 0.10 g of BHT were added to a 500-mL flask, then the temperature was increased to 120° C. taking 2 hours, and reaction was performed for 5 hours. After the reaction was ended, the temperature was reduced to 70° C., 17.5 g of (D-2) was added, and reaction was performed for 3 hours. After that, 23.1 g of "HEAA" and 0.04 g of DBTDL were added to the solution, and reaction was performed for 2 hours. After the reaction was ended, analysis, purification, identification, etc. were performed in a similar manner to Synthesis Example 15, and it was determined that the obtained 158.2 g of a pale-yellow viscous liquid was the objective photopolymerization initiator (C-17) having an acrylamide group as an unsaturated bond. Further, by GPC analysis, the number-average molecular weight of (C-17) was calculated to be 11200. The ratio between the number of ethylenic unsaturated bonds (acrylamide groups) and the number of photopolymerization initiating functional groups (benzophenone groups) was 10/1.

Synthesis Example 26: Synthesis of a Photopolymerization Initiator Having an Unsaturated Bond (C-18)

31.2 g of (D-7), 42.9 g of (E-7), 37.4 g of (F-3), 8.3 g of HEAA, 0.06 g of acetylacetone iron as a catalyst, 0.10 g of BHT, and 80 g of DMF were added into a flask similar to that used in Synthesis Example 1. The temperature was increased to 70° C. while the mixed liquid was stirred, and reaction was performed at 70° C. for 11 hours. After the reaction was ended, analysis, purification, identification, etc. were performed in a similar manner to Synthesis Example 15, and it was determined that the obtained 106.9 g of a pale-yellow viscous liquid was the objective photopolymerization initiator (C-18) having an acrylamide group as an unsaturated bond. Further, by GPC analysis, the number-average molecular weight of (C-18) was calculated to be 5000. The ratio between the number of ethylenic unsaturated bonds (acrylamide groups) and the number of photopolymerization initiating functional groups (benzophenone groups) was 1/1.

Comparative Synthesis Example 1: Synthesis of a Benzophenone-Containing Photopolymerization Initiator not Having an Ethylenic Unsaturated Bond (K-1)

18.3 g of (D-1), 85.6 g of (E-5), 31.7 g of (F-1), 4.3 g of n-butanol, 0.06 g of tin 2-ethylhexanoate as a catalyst, 0.10 g of BHT, and 60 g of DMF were added into a flask similar to that used in Synthesis Example 1. The temperature was increased to 80° C. while the mixed liquid was stirred, and reaction was performed at 80° C. for 10 hours. After the reaction was ended, analysis, purification, identification, etc. were performed in a similar manner to Synthesis Example 15, and it was determined that the obtained 106.7 g of a pale-yellow viscous liquid was the benzophenone-containing photopolymerization initiator not having an ethylenic unsaturated bond (K-1). Further, by GPC analysis, the number-average molecular weight of (K-1) was calculated to be 7500.

Comparative Synthesis Example 2: Preparation of a Mixture of Urethane Acrylamide Group Oligomers and Benzophenone (K-2)

Like in the apparatus used in Synthesis Example 1, 105.3 g of (E-5), 29.2 g of (F-2), 5.4 g of NMAA, 0.06 g of tin 2-ethylhexanoate, 0.10 g of BHT, and 60 g of ethyl acetate were added into a 500-mL flask, and reaction was performed for 12 hours while stirring was performed at 70° C. After the reaction was ended, analysis, purification, identification, etc. were performed in a similar manner to Synthesis Example 15, and it was determined that urethane acrylamide group oligomers were obtained. After that, 26.0 g of benzophenone was added into the obtained oligomers, and mixing was performed well; thus, the mixture of urethane acrylamide group oligomers and benzophenone (K-2) was obtained as a pale-yellow viscous liquid (108.1 g). By GPC analysis, the number-average molecular weight of the urethane acrylamide group oligomer was calculated to be 8000.

Examples 1 to 24 and Comparative Examples 1 to 8

Photocurable resin compositions were prepared by using the photopolymerization initiators having unsaturated bonds (C-1) to (C-18) obtained in the Synthesis Examples, the known photopolymerization initiators (G), the benzophenone-containing photopolymerization initiator not having an ethylenic unsaturated bond (K-1), and the mixture of urethane acrylamide group oligomers and benzophenone (K-2), and performing mixing at 25° C. for 30 minutes with the monofunctional unsaturated compounds (H), the polyfunctional unsaturated compounds (I), and the other components (J), which were weighed out at the proportions shown in Table 1 to Table 3. The compatibility and the curability for light with different wavelengths of the components used for the obtained photocurable resin composition were evaluated by the following methods; the results are shown in Tables 1 to 3.

(1) Compatibility

The state of the prepared photocurable resin composition was visually observed, and the compatibility of the components was evaluated in three levels.

+: There is no precipitate or turbidity, and the composition is in a completely dissolved transparent state.

+−: There is slight turbidity.

−: There is a precipitate or turbidity.

(2) Curability

The obtained photocurable resin composition was coated onto an easy adhesion-treated surface of a PET film with a thickness of 100 μm ("COSMOSHINE A-4100", manufactured by Toyobo Co., Ltd.) by using a bar coater in such a manner that the film thickness was 20 μm, then ultraviolet rays were applied to cure the coating, and the integrated amount of light at which there was no longer any tackiness upon touching the cured product was determined, and the curability was evaluated in four levels. Three kinds of lamps for ultraviolet irradiation, described in 1) to 3) below, were used. The lower the integrated amount of light necessary for loss of tackiness is, the higher the curability is.

1) Metal halide lamp: wavelength 200 to 450 nm, output power 100 mW/cm$^2$

2) UV LED lamp: wavelength 385 nm, output power 100 mW/cm$^2$

3) UV LED lamp: wavelength 405 nm, output power 100 mW/cm$^2$

++: No tackiness at an integrated amount of light of less than 1000 mJ/cm$^2$.

+: No tackiness at an integrated amount of light of not less than 1000 mJ/cm$^2$ and less than 3000 mJ/cm$^2$.

+−: No tackiness at an integrated amount of light of not less than 3000 mJ/cm$^2$ and less than 20000 mJ/cm$^2$.

−: Tackiness remains even at an integrated amount of light of 20000 mJ/cm$^2$.

TABLE 1

| Photocurable resin composition (wt %) | Examples | | | | | | | | | |
|---|---|---|---|---|---|---|---|---|---|---|
| | 1 | 2 | 3 | 4 | 5 | 6 | 7 | 8 | 9 | 10 |
| Photopolymerization initiator | C-1 | C-1 | C-2 | C-3 | C-3 | C-4 | C-4 | C-5 | C-6 | C-6 |
| | 5 | 5 | 5 | 5 | 5 | 5 | 0.5 | 5 | 5 | 50 |
| H-1 | 20 | 20 | 20 | 20 | 20 | 20 | 24.5 | 20 | 20 | 20 |
| H-2 | 30 | 30 | 30 | 30 | 30 | 30 | 30 | 30 | 30 | 30 |
| I-1 | 25 | 20 | 25 | 25 | 20 | 25 | 20 | 25 | 25 | |
| I-2 | 20 | 20 | 20 | 20 | 20 | 20 | 20 | 20 | 20 | |
| J-1 | | 5 | | | | | 5 | | | |
| J-2 | | | | | 5 | | | | | |
| Compatibility | + | + | + | + | + | + | + | + | + | + |
| Curability Metal halide lamp | ++ | ++ | ++ | ++ | ++ | ++ | + | ++ | ++ | ++ |
| 385 nm UV LED | ++ | ++ | ++ | ++ | ++ | ++ | + | ++ | ++ | ++ |
| 405 nm UV LED | + | + | + | + | ++ | + | +− | + | + | ++ |

TABLE 2

| Photocurable resin composition (wt %) | Examples | | | | | | | | | | | | | |
|---|---|---|---|---|---|---|---|---|---|---|---|---|---|---|
| | 11 | 12 | 13 | 14 | 15 | 16 | 17 | 18 | 19 | 20 | 21 | 22 | 23 | 24 |
| Photopolymerization initiator | C-7 | C-8 | C-9 | C-10 | C-10 | C-11 | C-11 | C-12 | C-13 | C-14 | C-15 | C-16 | C-17 | C-18 |
| | 5 | 10 | 95 | 1 | 10 | 10 | 30 | 10 | 10 | 10 | 10 | 10 | 10 | 10 |
| Average number of benzophenone groups per molecule | 1 | 2 | 4 | 6 | 6 | 1 | 1 | 12 | 1 | 3 | 2 | 2 | 2 | 2 |
| Average number of urethane bonds per molecule | 4 | 10 | 12 | 30 | 30 | 10 | 10 | 36 | 22 | 12 | | | | 12 |
| H-1 | 20 | 20 | | 29 | 20 | 20 | 20 | 20 | 20 | 20 | 20 | 20 | 20 | 20 |
| H-2 | 30 | 30 | | 30 | 30 | 30 | 30 | 30 | 30 | 30 | 30 | 30 | 30 | 30 |
| I-1 | 20 | 20 | | 20 | 20 | 20 | 10 | 20 | 20 | 20 | 20 | 20 | 20 | 20 |
| I-2 | 20 | 20 | 5 | 20 | 20 | 20 | 5 | 20 | 20 | 20 | 20 | 20 | 20 | 20 |
| J-1 | 5 | | | | | | | | | | | | | |
| J-2 | | | | | | | 5 | | | | | | | |
| Compatibility | + | + | + | + | + | + | +− | + | + | + | + | + | +− | +− |
| Curability Metal halide lamp | ++ | ++ | ++ | + | ++ | ++ | ++ | ++ | ++ | ++ | ++ | ++ | ++ | ++ |
| 385 nm UV LED | ++ | ++ | ++ | + | ++ | ++ | ++ | ++ | ++ | ++ | + | ++ | + | ++ |
| 405 nm UV LED | + | + | ++ | +− | + | + | ++ | ++ | + | + | + | + | + | ++ |

TABLE 3

| Photocurable resin composition (wt %) | Comparative Examples | | | | | | | |
|---|---|---|---|---|---|---|---|---|
| | 1 | 2 | 3 | 4 | 5 | 6 | 7 | 8 |
| Photopolymerization initiator | G-1 | G-2 | G-2 | G-3 | G-4 | G-5 | K-1 | K-2 |
| | 5 | 5 | 0.5 | 5 | 2 | 5 | 10 | 10 |
| Average number of benzophenone groups per molecule | | | | | | | 1 | |
| Average number of urethane bonds per molecule | | | | | | | 10 | 10 |
| H-1 | 20 | 20 | 24.5 | 20 | 20 | 20 | 20 | 20 |
| H-2 | 30 | 30 | 30 | 30 | 30 | 30 | 30 | 30 |
| I-1 | 25 | 25 | 20 | 25 | 20 | 25 | 20 | 20 |
| I-2 | 20 | 20 | 20 | 20 | 20 | 20 | 20 | 20 |
| J-1 | | | | 5 | | 3 | | |
| J-2 | | | | | | 5 | | |
| Compatibility | + | +− | − | +− | + | + | + | + |

TABLE 3-continued

| Photocurable resin composition (wt %) | | Comparative Examples | | | | | | | |
|---|---|---|---|---|---|---|---|---|---|
| | | 1 | 2 | 3 | 4 | 5 | 6 | 7 | 8 |
| Curability | Metal halide lamp | + | +− | − | + | − | +− | +− | − |
| | 385 nm UV LED | − | − | − | − | − | − | +− | − |
| | 405 nm UV LED | − | − | − | − | − | − | − | − |

Examples 25 to 29 and Comparative Examples 9 to 11

Photocurable resin compositions for hard coating were prepared by using the photopolymerization initiators having unsaturated bonds (C-1) to (C-18) obtained in the Synthesis Examples, the known photopolymerization initiators (G), the benzophenone-containing photopolymerization initiator (K-1), and the benzophenone-added photopolymerization initiator (K-2), and performing mixing at 25° C. for 30 minutes with the monofunctional unsaturated compounds (H), the polyfunctional unsaturated compounds (I), and the other components (J), which were weighed out at the proportions shown in Table 4. The adhesiveness, pencil hardness, yellowing resistance, weather resistance, and corrosion resistance of the obtained photocurable resin composition for hard coating were evaluated by the following methods; the results are shown in Table 4.

(3) Adhesiveness

The obtained photocurable resin composition for hard coating was coated individually onto test pieces of polycarbonate ("PC1600", manufactured by C.I. TAKIRON Corporation), glass ("EAGLE XG", manufactured by Corning Japan K.K.), and SUS 304 by using a bar coater in such a manner that the dried film thickness was 5 μm, and drying was performed for 2 minutes in an 80° C. constant temperature oven. A UV LED lamp of a wavelength of 385 nm and an output power of 100 mW/cm$^2$ was used to perform irradiation in such a manner that the integrated amount of light was 3000 mJ/cm$^2$; thus, a cured film was produced. In conformity with JIS K 5600, the obtained cured film was cut with a utility knife to produce 100 grid squares each having one-millimeter sides, a commercially available cellophane tape was stuck to and then peeled off from the test piece, and the number of grid squares remaining on the test piece at this time was evaluated in four levels. The larger the number of remaining grid squares on the test piece is, the higher the adhesiveness is.

++: The number of remaining grid squares is 100.

+: The number of remaining grid squares is 90 to 99.

+−: The number of remaining grid squares is 60 to 89.

−: The number of remaining grid squares is less than 60.

(4) Pencil Hardness

A cured film was produced on a test piece of polycarbonate in a similar manner to the evaluation of adhesiveness; in conformity with JIS K 5600, the surface of the cured film was scratched with a pencil (with an angle of 45° and a length of approximately 10 mm), then the hardest pencil among those that did not mark a flaw on the surface of the cured film was taken as the pencil hardness, and evaluation was performed in four levels.

++: The pencil hardness is 2H or more.

+: The pencil hardness is HB to H.

+−: The pencil hardness is 3B to B.

−: The pencil hardness is 4B or less.

(5) Yellowing Resistance

The obtained photocurable resin composition for hard coating was coated onto an easy adhesion-treated surface of a PET film with a thickness of 100 μm ("COSMOSHINE A-4100", manufactured by Toyobo Co., Ltd.) by using a bar coater in such a manner that the dried film thickness was 5 μm, and drying was performed for 2 minutes in an 80° C. constant temperature oven. A UV LED lamp of a wavelength of 385 nm and an output power of 100 mW/cm$^2$ was used to perform irradiation in such a manner that the integrated amount of light was 3000 mJ/cm$^2$, thus a cured film was produced, and the cured film was allowed to stand for 24 hours in an atmosphere of a temperature of 23° C. and a relative humidity of 50%. After that, a transmission spectrum of the cured film was measured by a transmission color measurement-dedicated machine (TZ-6000, manufactured by Nippon Denshoku Industries Co., Ltd.), which was taken as the initial b value. The cured film was allowed to stand still for 500 hours in a thermo-hygrostat machine set at 85° C. and a relative humidity of 85%, and thereby an accelerated test of yellowing resistance was performed. The cured film after the test was allowed to stand for 24 hours in an atmosphere of a temperature of 23° C. and a relative humidity of 50%; then, a transmission spectrum of the cured film was measured by a similar transmission color measurement-dedicated machine, which was taken as the after-moisture-heat b value. The difference between the after-moisture-heat b value and the initial b value was defined as a change value Δb (Δb=the after-moisture-heat b value−the initial b value). The yellowing resistance was evaluated in three levels as follows.

+: Both the initial b value and the after-moisture-heat b value are not more than 0.5, and Δb is not more than 0.2.

+−: Either one or both of the initial b value and the after-moisture-heat b values are more than 0.5 but both are not more than 1.0, and Δb is not more than 0.3.

−: Either one or both of the initial b value and the after-moisture-heat b value are more than 1.0, or Δb is more than 0.3.

(6) Weather Resistance

A cured film was produced on a PET film in a similar manner to the evaluation of yellowing resistance, and an accelerated test of 250 hours was carried out by a Sunshine Weather Meter (manufactured by Suga Test Instruments Co., Ltd.). The rate of change in glossiness before and after the test was calculated with a glossmeter ("VG7000", manufactured by Nippon Denshoku Industries Co., Ltd.), and was evaluated in two levels.

+: The rate of change in glossiness is less than 20%.
−: The rate of change in glossiness is not less than 20%.
(7) Corrosion Resistance The obtained photocurable resin composition for hard coating was coated onto a test piece of copper by using a bar coater in such a manner that the dried film thickness was 5 μm, and drying was performed for 2 minutes in a constant temperature oven of 80° C. A UV LED lamp of a wavelength of 385 nm and an output power of 100 mW/cm² was used to perform irradiation in such a manner that the integrated amount of light was 3000 mJ/cm², thus a cured film was produced, and the cured film was allowed to stand for 168 hours in a thermo-hygrostat machine set at a temperature of 60° C. and a relative humidity of 95%. After that, the cured film was peeled off from the test piece; the surface of the test piece was visually observed, and the corrosion resistance was evaluated in four levels.

++: There is no corrosion.
+: There is slight corrosion.
+−: There is a little corrosion.
−: There is significant corrosion.

be produced as by-products by decomposition are not generated. In contrast, in the compositions containing known photopolymerization initiators (Comparative Examples 9 to 11), the curability for long-wavelength light was low, and therefore the adhesiveness, surface hardness, yellowing resistance, weather resistance, and corrosion resistance of the cured film were low. Thus, the composition containing a photopolymerization initiator having an unsaturated bond of the present invention can be suitably used for photocurable hard coating agents.

INDUSTRIAL APPLICABILITY

As described hereinabove, photopolymerization initiators having one or more unsaturated bonds of the present invention have high photo initiating ability and photo curability, and they can initiate photopolymerization and undergo photocuring reaction by using a great variety of light sources from metal halide lamps to UV LED lamps of a wavelength of 405 nm. Further, the kinds and the numbers of photopolymerization initiating functional groups and ethylenic

TABLE 4

| Photocurable resin composition | | Examples | | | | | Comparative Examples | | |
|---|---|---|---|---|---|---|---|---|---|
| for hard coating (wt %) | | 25 | 26 | 27 | 28 | 29 | 9 | 10 | 11 |
| Photopolymerization | | C-2 | C-5 | C-6 | C-8 | C-12 | G-1 | G-2 | K-1 |
| initiator | | 5 | 5 | 5 | 10 | 10 | 5 | 5 | 10 |
| H-3 | | 40 | 30 | 30 | 35 | 30 | 30 | 30 | 30 |
| H-4 | | 20 | 20 | 20 | 20 | 20 | 20 | 20 | 20 |
| I-3 | | 15 | 15 | 15 | 15 | 15 | 25 | 15 | 15 |
| I-4 | | 20 | 20 | 20 | 20 | 15 | 20 | 20 | 15 |
| J-3 | | | 10 | 10 | | 10 | | 10 | 10 |
| MEK | | 150 | 150 | 150 | 150 | 150 | 150 | 150 | 150 |
| Adhesiveness | Polycarbonate | ++ | ++ | ++ | ++ | ++ | +− | +− | + |
| | Glass | ++ | + | + | + | ++ | − | − | − |
| | SUS | + | + | + | + | + | − | − | − |
| Pencil hardness | | + | ++ | ++ | + | ++ | +− | − | +− |
| Yellowing resistance | | + | + | + | + | + | − | +− | − |
| Weather resistance | | + | + | + | + | + | − | − | +− |
| Corrosion resistance | | + | ++ | ++ | + | ++ | +− | − | +− |

As is clear from the results of Table 1 to Table 4, in the photopolymerization initiators having unsaturated bonds of the present invention (Examples 1 to 24), the compatibility with general-purpose monofunctional unsaturated compounds and polyfunctional unsaturated compounds was good, and the curability for various light, from short wavelengths to long wavelengths, was high. On the other hand, in the case where known photopolymerization initiators were used (Comparative Examples 1 to 8), the compatibility of the obtained photocurable resin composition was insufficient, and the curability for long-wavelength light was low. It is presumed that these different physical properties between the Examples and the Comparative Examples are due to interaction between the hydrophobic photopolymerization initiating functional group and the hydrophilic unsaturated bond contained in the molecule of the photopolymerization initiator having an unsaturated bond. Further, the compositions containing photopolymerization initiators having unsaturated bonds (Examples 25 to 29) have high curability even in long-wavelength light irradiation, and the obtained cured films have good adhesiveness and high surface hardness. Further, the yellowing resistance, the weather resistance, and the corrosion resistance are also high; this is presumed to be because undecomposed substances that might remain in the cured film after photocuring, and low molecular decomposed substances that might unsaturated bonds in the molecule can be arbitrarily adjusted by structural design, and good cured products are obtained without causing offensive odors, etc. due to remaining photopolymerization initiator or decomposed substances. The photopolymerization initiator having an unsaturated bond of the present invention makes it possible to manufacture photocurable resin compositions suitable for various uses by combination with various unsaturated group-containing compounds, and the photopolymerization initiator can provide various physical properties such as high adhesiveness, surface hardness, yellowing resistance, weather resistance, and corrosion resistance. The photopolymerization initiator can moreover be suitably used as photocurable ink compositions, photocurable inkjet ink compositions, photocurable nail cosmetic compositions, photocurable pressure-sensitive adhesive compositions, photocurable adhesives compositions, photocurable caulking agent compositions, photocurable coating agent compositions, photocurable resin compositions for decorative sheets, photocurable resin compositions for self-healing materials, photocurable elastomer compositions, photocurable resin compositions for stereo shaping, photocurable vehicular coating agent compositions, etc.

The invention claimed is:
1. A photopolymerization initiator comprising one or more ethylenic unsaturated bonds and one or more photo- polymerization initiating functional groups in a molecule, wherein the photopolymerization initiating functional groups are hydrogen extraction type, and the photopolymerization initiating functional groups of the molecule comprise one or more benzophenone structures in which one or more ester groups are directly bonded to the benzophenone structures, where the carbonyl carbon of each of the one or more ester groups is directly bonded to the benzophenone structures.

2. The photopolymerization initiator according to claim 1, wherein
the ethylenic unsaturated bond is one or more bonds selected from the group consisting of a (meth)acrylamide group, a (meth)acrylate group, a vinyl group, a vinyl ether group, an alkyl vinyl ether group, an allyl group, a (meth)allyl ether group, and a maleimide group.

3. The photopolymerization initiator according to claim 1, comprising one or more (meth)acrylamide groups as the ethylenic unsaturated bond.

4. The photopolymerization initiator according to claim 1, comprising a photopolymerization initiating functional group that generates a radical by a hydrogen extraction reaction occurring in the molecule and/or between molecules.

5. The photopolymerization initiator according to claim 1, wherein
a ratio between the number of photopolymerization initiating functional groups and the number of ethylenic unsaturated bonds is 1/10 to 10/1 in the molecule.

6. The photopolymerization initiator according to claim 1, having one or more urethane bonds in the molecule.

7. The photopolymerization initiator according to claim 1, represented by general formula (1):

[Chem.1]

general formula (1)

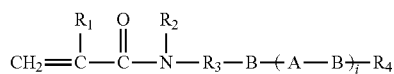

(wherein $R_1$ represents a hydrogen atom or a methyl group; $R_2$ represents a hydrogen atom or a straight-chain alkyl group or a hydroxyalkylene group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms; $R_3$ represents a straight-chain alkylene group having 1 to 24 carbon atoms, an alkenyl group or an alkyleneoxyalkylene group having 2 to 24 carbon atoms, a branched alkylene group having 3 to 36 carbon atoms, or an aromatic hydrocarbon having 6 to 24 carbon atoms; $R_4$ represents a straight-chain alkyl group or a hydroxyalkylene group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with an ethylenic unsaturated bond, where the ethylenic unsaturated bond in $R_4$ is one or more bonds selected from the group consisting of a (meth)acrylamide group, a (meth)acrylate group, a vinyl group, a vinyl ether group, an alkyl vinyl ether group, an allyl group, a (meth)allyl ether group, and a maleimide group; A represents a benzophenone derivative represented by general formula (2); B represents a divalent or higher organic group having a urethane group, a urea group, an ester group, an amide group, or an imide group; and i represents an integer of 1 to 25),

[Chem. 2]

general formula (2)

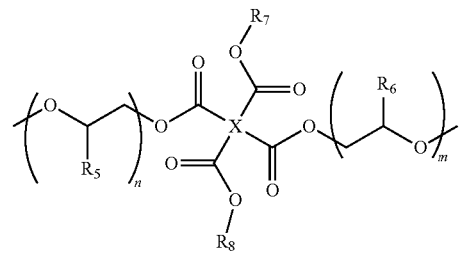

(wherein $R_5$ and $R_6$ each independently represent a straight-chain alkyl group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with an ether group, a cyclic ether group, an ester group, or a halogen group; $R_7$ and $R_8$ each independently represent a straight-chain alkyl group having 1 to 24 carbon atoms, an alkenyl group or an alkyleneoxyalkyl group having 2 to 24 carbon atoms, a branched alkyl group or an alicyclic hydrocarbon having 3 to 24 carbon atoms, or an aromatic hydrocarbon having 6 to 24 carbon atoms that is optionally substituted with a halogen group; X represents a tetravalent organic group represented by general formula (3); and n and m each independently represent an integer of 1 to 10),

[Chem. 3]

general formula (3)

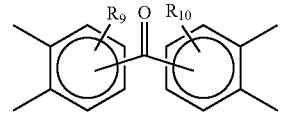

(wherein $R_9$ and $R_{10}$ each independently represent a hydrogen atom, a straight-chain alkyl group having 1 to 8 carbon atoms, or a branched alkyl group having 3 to 8 carbon atoms).

8. The photopolymerization initiator according to claim 7, wherein,
in the photopolymerization initiator according to the general formula (1), B is a divalent or higher organic group having one or more urethane groups, and a number-average molecular weight is 1000 to 100000.

9. The photopolymerization initiator according to claim 1, having polymerization initiating ability for light of a wavelength of 300 to 450 nm.

10. A photopolymerizable resin composition containing the photopolymerization initiator according to claim 1, wherein the amount of the photopolymerization initiator contained is 0.1 mass % or more.

11. A method for manufacturing the photopolymerization initiator according to claim 7, the method comprising reacting together (1) a compound having one or more (meth) acrylamide groups and one or more reactive groups in the molecule, (2) a compound having one or more benzophenone structures and one or more reactive groups in the molecule, and (3) a compound having two or more reactive groups in the molecule, wherein the reactive groups of (3) can make an organic reaction or an inorganic reaction with the reactive groups of (1) and (2).

12. The photopolymerization initiator according to claim 1, comprising 1 to 20 benzophenone structures in the molecule.

13. The photopolymerization initiator according to claim 6, comprising 1 to 40 urethane bonds in the molecule.

14. The photopolymerization initiator according to claim 1, wherein four ester groups are directly bonded to the benzophenone structures, and one or more urethane bonds are contained in the same molecule.

15. A photocurable coating agent composition comprising 0.1 mass % or more of the photopolymerization initiator according to claim 1.

16. A photocurable ink composition comprising 0.1 mass % or more of the photopolymerization initiator according to claim 1.

17. A photocurable adhesive composition comprising 0.1 mass % or more of the photopolymerization initiator according to claim 1.

18. A photocurable resin composition for stereo shaping comprising 0.1 mass % or more of the photopolymerization initiator according to claim 1.

* * * * *